US012265895B2

(12) United States Patent
Zeiler et al.

(10) Patent No.: US 12,265,895 B2
(45) Date of Patent: Apr. 1, 2025

(54) ARTIFICIAL INTELLIGENCE MODEL AND DATA COLLECTION/DEVELOPMENT PLATFORM

(71) Applicant: CLARIFAI, INC., Wilmington, DE (US)

(72) Inventors: Matthew Zeiler, Fort Lee, NJ (US); Daniel Kantor, New York, NY (US); Christopher Fox, New York, NY (US); Cassidy Williams, New York, NY (US)

(73) Assignee: CLARIFAI, INC., Wilmington, DE (US)

( * ) Notice: Subject to any disclaimer, the term of this patent is extended or adjusted under 35 U.S.C. 154(b) by 937 days.

(21) Appl. No.: 17/370,043

(22) Filed: Jul. 8, 2021

(65) Prior Publication Data
US 2021/0342745 A1 Nov. 4, 2021

Related U.S. Application Data

(63) Continuation of application No. 15/715,433, filed on Sep. 26, 2017, now Pat. No. 11,080,616.
(Continued)

(51) Int. Cl.
*G06N 20/00* (2019.01)
*G06F 3/048* (2013.01)
(Continued)

(52) U.S. Cl.
CPC ............. *G06N 20/00* (2019.01); *G06F 3/048* (2013.01); *G06F 8/00* (2013.01); *G06F 8/31* (2013.01);
(Continued)

(58) Field of Classification Search
CPC .......... G06N 20/00; G06N 3/045; G06N 5/04; G06F 3/048; G06F 8/00; G06F 8/31; G06F 8/65
(Continued)

(56) References Cited

U.S. PATENT DOCUMENTS 10,380,498 B1 8/2019 Chaoji et al.
10,726,356 B1 7/2020 Zarandioon et al.
(Continued)

OTHER PUBLICATIONS

Batista, et al., "A study of the behavior of several methods for balancing machine learning training data", ACM SIGKDD Explorations Newsletter, vol. 6, Issue 1, pp. 20-29, Jun. 1, 2004 (Year: 200).*

(Continued)

*Primary Examiner* — Tsu-Chang Lee
(74) *Attorney, Agent, or Firm* — Buckley, Maschoff & Talwalkar LLC

(57) ABSTRACT

In some embodiments, a service platform that facilitates artificial intelligence model and data collection and collection may be provided. Input/output information derived from machine learning models may be obtained via the service platform. The input/output information may indicate (i) first items provided as input to at least one model of the machine learning models, (ii) first prediction outputs derived from the at least one model's processing of the first items, (iii) second items provided as input to at least another model of the machine learning models, (iv) second prediction outputs derived from the at least one other model's processing of the second items, and (v) other inputs and outputs. The input/output information may be provided via the service platform to update a first machine learning model. The first machine learning model may be updated based on the input/output information being provided as input to the first machine learning model.

14 Claims, 9 Drawing Sheets

Related U.S. Application Data

(60) Provisional application No. 62/400,543, filed on Sep. 27, 2016.

(51) Int. Cl.
  *G06F 8/00* (2018.01)
  *G06F 8/30* (2018.01)
  *G06F 8/65* (2018.01)
  *G06N 3/045* (2023.01)
  *G06N 5/04* (2023.01)

(52) U.S. Cl.
  CPC .............. *G06F 8/65* (2013.01); *G06N 3/045* (2023.01); *G06N 5/04* (2013.01)

(58) Field of Classification Search
  USPC .......................................................... 706/12
  See application file for complete search history.

(56) References Cited

U.S. PATENT DOCUMENTS

| | | | |
|---|---|---|---|
| 2015/0193695 A1* | 7/2015 | Cruz Mota | H04L 63/1425 |
| | | | 706/12 |
| 2016/0110657 A1 | 4/2016 | Gibiansky et al. | |
| 2018/0240011 A1 | 8/2018 | Tan et al. | |

OTHER PUBLICATIONS

892 Notice of References Cited with was issued in U.S. Appl. No. 15/715,433 dated Dec. 11, 2020.
892 Notice of References Cited with was issued in U.S. Appl. No. 15/715,433 dated Mar. 29, 2021.

* cited by examiner

ARTIFICIAL INTELLIGENCE MODEL AND DATA COLLECTION/DEVELOPMENT PLATFORM

RELATED APPLICATIONS

This application is a continuation of U.S. application Ser. No. 15/715,433, filed on Sep. 26, 2017, in the United States Patent and Trademark Office, which claims the benefit of U.S. Provisional Patent Application No. 62/400,543, filed on Sep. 27, 2016, in the United States Patent and Trademark Office, the entire disclosures of which are hereby incorporated by reference in their entirety.

FIELD OF THE INVENTION

The invention relates to facilitating artificial intelligence model and data collection/development, including, for example, collection/development of artificial intelligence models and data via a service platform, generation of a machine-learning-incorporated software application via user-selectable/connectable model representations of an interactive user interface, etc.

BACKGROUND OF THE INVENTION

In recent years, the field of artificial intelligence and machine learning has experienced a resurgence due to advances in performance of computer hardware, sizes of training sets, theoretical understanding of artificial intelligence, and other advances. This resurgence has enabled many advances in other technical fields, including recognition or other prediction systems. Existing artificial intelligence development, however, is often a slow process. As an example, artificial intelligence development typically requires a developer to assemble a set of labeled images, choose a model architecture, and apply a machine learning algorithm to find a choice of parameters that produces good classification performance for their specific domain. These and other drawbacks exist.

SUMMARY OF THE INVENTION

Aspects of the invention relate to methods, apparatuses, and/or systems for facilitating development of a prediction model via a service platform.

In some embodiments, collection/development of one or more prediction models, prediction-model-incorporated software applications, or related data may be facilitated. Such prediction models may include neural networks, other machine learning models, or other prediction models. As an example, a service platform may facilitate collection/development of (i) training data for machine learning models, (ii) domains of the machine learning models, (iii) things learned by the machine learning models (e.g., concepts learned by the machine learning models), (iv) the architectures of the machine learning models, (v) the accuracy/speed of operation or cost of various machine learning models, (vi) different available/stored versions of the machine learning models, or (vii) other items or information. The training data may include (i) inputs to be provided to a machine learning model (e.g., inputs provided to and processed by other machine learning models or other inputs), (ii) reference outputs that are to be derived from a machine learning model's processing of such inputs (e.g., user-confirmed or user-provided outputs, outputs confirmed through one or more machine learning models' processing of such inputs, outputs confirmed multiple times by processing of such inputs by respective sets of machine learning models, or other reference outputs), (iii) reference indications of outputs that are not to be derived from a machine learning model's processing of such inputs (e.g., user indications that such outputs are inaccurate or other reference indications), or (iv) other training data.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
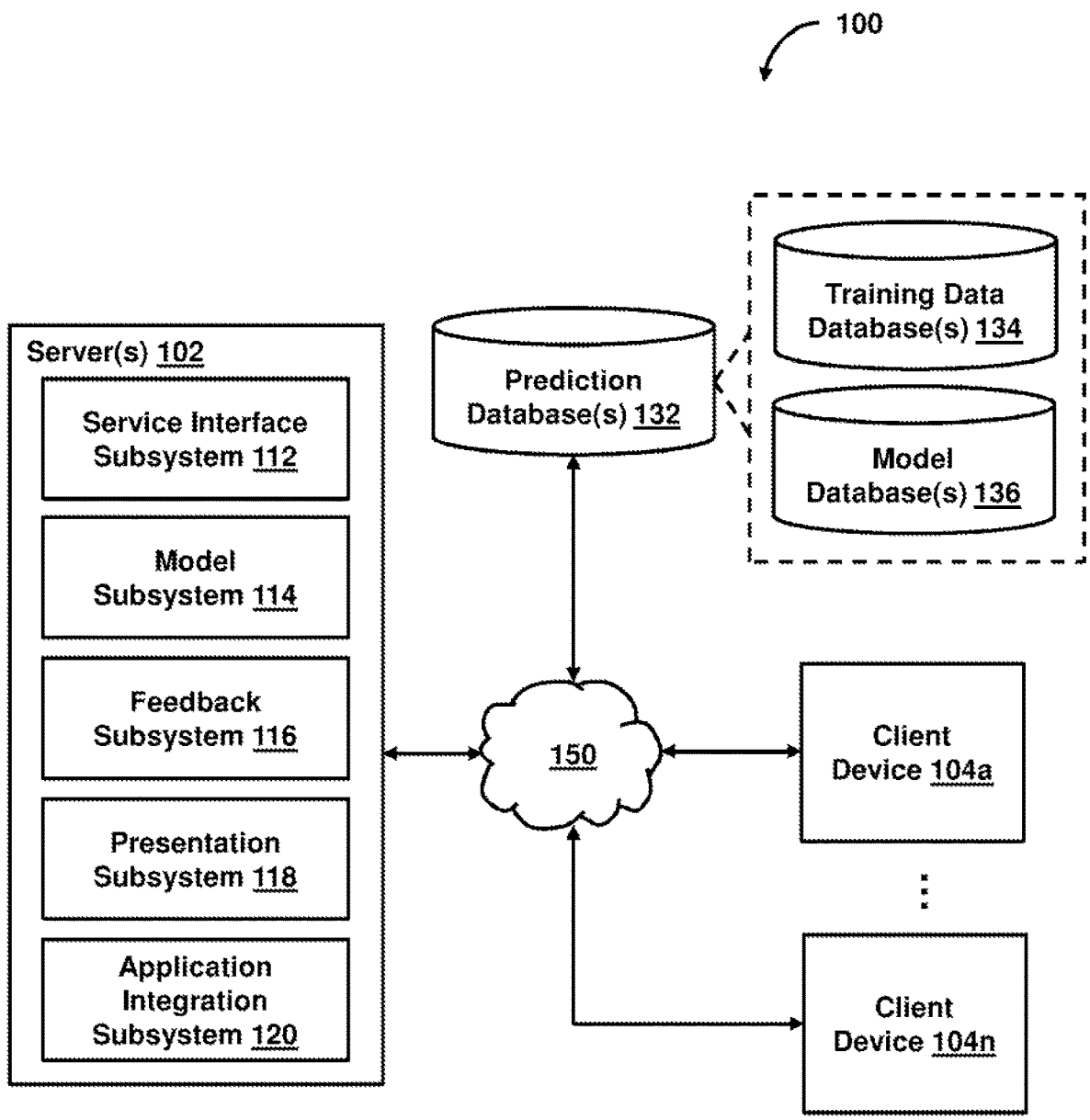
FIG. 1 shows a system for facilitating collection/development of a prediction model, a prediction-model-incorporated software application, and related data, in accordance with one or more embodiments.

FIG. 1 shows a system 100 for facilitating development of a prediction model or a prediction-model-incorporated software application, in accordance with one or more embodiments. As shown in FIG. 1, system 100 may include server(s) 102, client device 104 (or client devices 104a-104n), or other components. Server 102 may include service interface subsystem 112, model subsystem 114, feedback subsystem 116, presentation subsystem 118, application integration subsystem 120, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of server 102, those operations may, in some embodiments, be performed by other components of server 102 or other components of system 100. As an example, while one or more operations are described herein as being performed by components of server 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

Artificial Intelligence Model and Data Collection/Development

In some embodiments, system 100 may facilitate collection/development of one or more prediction models, prediction-model-incorporated software applications, related data, or other aspects. The prediction models may include neural networks, other machine learning models, or other prediction models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

In some embodiments, system 100 may facilitate collaborative collection/development of prediction models, prediction-model-incorporated software applications, related data, or other aspects. As an example, additionally or alternatively to sharing or updating lines of code, system 100 may facilitate the sharing or updating of (i) training data for machine learning models, (ii) domains of the machine learning models, (iii) things learned by the machine learning models (e.g., concepts learned by the machine learning models), (iv) the architectures of the machine learning models, (v) the accuracy/speed of operation or cost of various machine learning models (e.g., prior to training on certain training data, subsequent to training on certain training data, prior to implementing code/architecture/training parameter/data changes, subsequent to implementing code/architecture/training parameter/data changes, etc.), (vi) different available/stored versions of the machine learning models, or (vii) other items or information. The training data may include (i) inputs to be provided to a machine learning model (e.g., inputs provided to and processed by other machine learning models or other inputs), (ii) reference outputs that are to be derived from a machine learning model's processing of such inputs (e.g., user-confirmed or user-provided outputs, outputs confirmed through one or more machine learning models' processing of such inputs, outputs confirmed multiple times by processing of such inputs by respective sets of machine learning models, or other reference outputs), (iii) reference indications of outputs that are not to be derived from a machine learning model's processing of such inputs (e.g., user indications that such outputs are inaccurate or other reference indications), or (iv) other training data.

As discussed, with respect to image classification models, existing machine learning development systems typically require a developer to (i) assemble a set of labeled images, (ii) choose a model architecture (e.g., a mathematical function defined over the set of possible inputs that assigns a probability to each possible class, parameterized by several weights), and (iii) apply a machine learning algorithm to find a choice of parameters that produces good classification performance for their specific domain. In some embodiments, a custom training API (or other service platform) may be provided such that the developer will not need to perform the last two steps, but the developer may still need to supply a set of labeled images (e.g., for training an image classification model or other prediction model).

In some embodiments, a collaborative artificial intelligence development environment (or service platform) may be provided to minimize costs associated with obtaining training data (e.g., such as a set of labeled images or other training data) by enabling a developer or other user to start from an existing prediction model (e.g., that is already pre-trained on some training data), extending the prediction model (or a new instance thereof) with additional classes and training data (e.g., "forking" the prediction model). In some embodiments, the collaborative artificial intelligence development environment may track different versions of the same prediction as new classes or training data are added. Organizations that want to keep their data and models private may also benefit because the foregoing forking and versioning features can facilitate collaboration among different members of an organization, and permissions on models can be specified to keep data and models private.

In some embodiments, a service platform may provide multiple classes of models on the service platform (e.g., one that is public, one that is private, or other classes for the models). The public models may be available for discovery through search throughout the service platform (e.g., by searching via a search tool provided on a website associated with the service platform), and any user may have access to them and contribute back to them (e.g., through a review process or automatically applying their updates to one or more models). The private models may be owned by one or more users (e.g., an organization, a group of users, etc.) and not be discoverable to all other users by default. Collaboration on these private models may be performed by users of the organization, users of the group, or specific additional collaborators added by the owners of such models. In some embodiments, such organizations, groups, or other entities may be charged more for the service platform's hosting and facilitating the development of a private model, as compared to the charges for the service platform's hosting and facilitating the development of a public model (e.g., on a per model basis, on a per user basis, etc.). The additional charges with respect to private models may be provided, for example, because the private models provide additional benefits to their owners, such as security, privacy, stability, hand tuning for only their applications, additional feature sets not available to public users and/or models, etc.

In some embodiments, a service platform may provide a marketplace for users, where users can be buyers or sellers of models or related data (e.g., training data or other data). The service platform or an operator of the marketplace charge a fee (e.g., a flat fee, a commission, etc.) for each sales posting, each sales transaction, use of tools to create or enhance the sales postings, or other items. Beyond just the commercial implications, the service platform may additionally or alternatively power research efforts. As an example, university labs may form teams and collaborate within the teams on their research. The service platform may charge reduced rates, such as student rates, educational rates, or other types of reduced rates.

In some embodiments, service interface subsystem 112 may provide a service platform that enables a developer to develop one or more machine learning models (e.g., neural networks or other machine learning models). In some embodiments, the service platform enables a developer to obtain training item information for training a machine learning model. As an example, the training item information may include information indicating inputs, information indicating prediction outputs derived from one or more machine learning models' processing of the inputs, or other information. In some embodiments, feedback subsystem 116 may obtain input/output information derived from machine learning models via the service platform. Model subsystem 114 may provide, via the service platform, the input/output information derived from the machine learning models (or other input/output information or other training information) to update one or more machine learning models. As an example, the input/output information may include (i) information related to first items provided as input to at least one model of the machine learning models, (ii) information related to first prediction outputs (or other outputs) derived from the model's processing of the first items, (iii) information related to second items provided as input to at least another model of the machine learning models, (iv) information related to second prediction outputs (or other outputs) derived from the other model's processing of the second item, (v) information related to other items provided as machine-learning-model input or other outputs derived from other machine learning models, or (vi) other information. As another example, the input/output information may be obtained from the machine learning models. As another example, the input/output information may be continuously obtained from the machine learning models (e.g., on a periodic basis, in accordance to a schedule, or based on other automated triggers).

Figure 2:
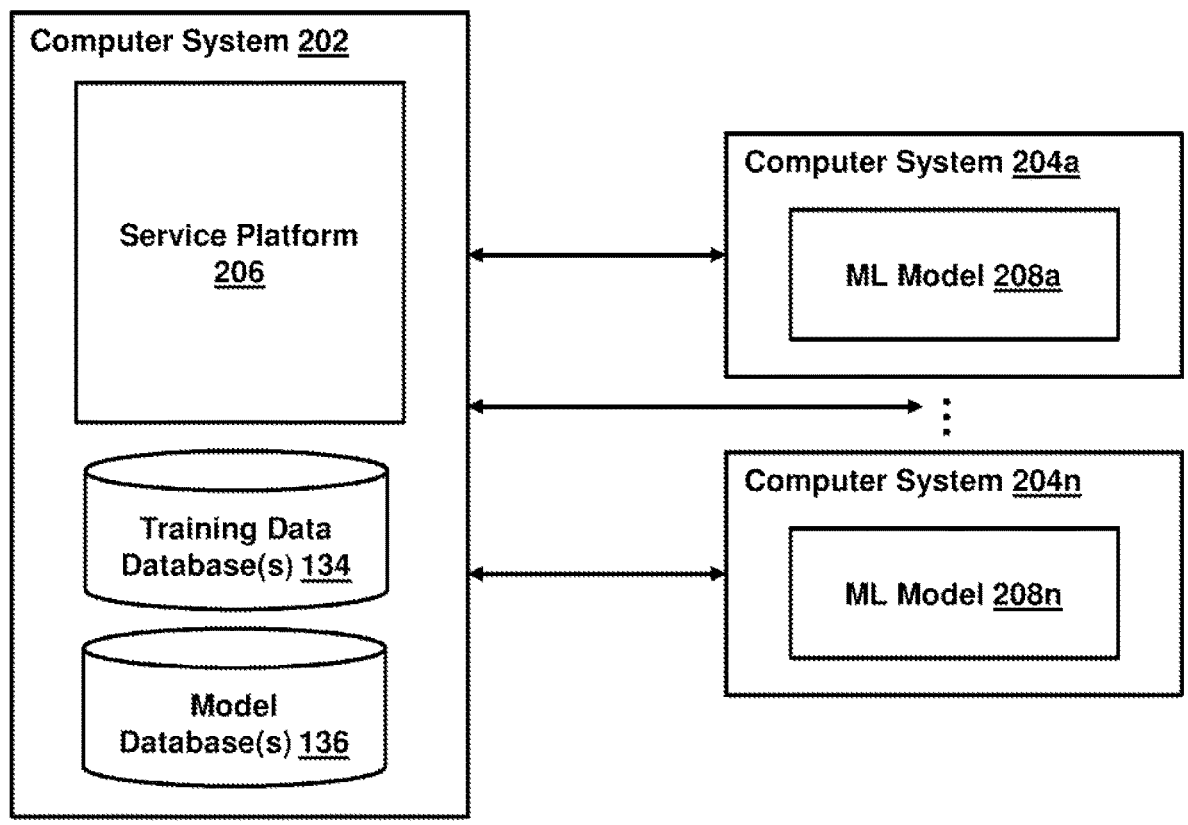
FIG. 2 shows computer systems, a service platform, machine learning models, and interactions between such components, in accordance with one or more embodiments.

As an example, with respect to FIG. 2, computer system 202 and one or more computer systems 204 (e.g., computer systems 204a-204n) may interact with one another to develop a collection of training data (or other data) that can be utilized to (i) develop one or more machine learning models (or other prediction models or components), (ii) train/update the machine learning models at service platform 206 of computer system 202, the machine learning models at computer system 204a (e.g., models 208a-208n), or other machine learning models, or (iii) perform other operations. In one use case, when users of computer systems 204 provide inputs (e.g., images to be processed to identify concepts in the images or other inputs) to their respective machine learning models and obtain outputs derived from the machine learning models (e.g., direct prediction outputs of the machine learning models or outputs derived from those prediction outputs), computer systems 204 may respectively map those inputs and outputs to one another (e.g., pairs of corresponding inputs and outputs or other mapping), and provide the mapped inputs and outputs to service platform 206 of computer system 202. Service platform 206 (of computer system 202) may thereafter utilize the mapped inputs and outputs as training data for one or more machine learning models stored at service platform 206 or elsewhere. In some cases, computer systems 204 may provide the mapped inputs and outputs to service platform 206 on a periodic basis, in accordance to a schedule, or based on other automated triggers.

In some embodiments, a service platform may enable users to share common data types as inputs or outputs, such as images, videos, prices, geo-location, tags, sentences, language translations, etc., with other users, and enable the users to refine them in order to improve the machine learning models (and/or non-machine-learning models). As an example, with respect to concept prediction (e.g., whether an image includes a "dog" or other concept), concepts created by one user may be shared and used as outputs to train another user's model. In some cases, the metadata for a concept (e.g., the concept's name, definition, synonyms, multiple language translations, or any links to other knowledge graphs) may also be community-edited so that everyone who uses the concept linked to their models obtains the additional or modified information when the concept is edited by the community of users. In some embodiments, the mapping between inputs and outputs that a machine learning model learns can be broken down based on each model type, the collection of inputs associated with each bucket of outputs that makes sense, or other criteria. As an example, a set of images that were labeled with a given concept like "dog" by one or more machine learning models may be provided as corresponding inputs (i.e., the set of images) and output(s) (e.g., prediction of "dog"). As the active user base of the service platform grows, the pool of overall data shareable among the users and the models increases. Typically, by providing more data to machine learning models (and/or non-machine-learning models), the models will become more accurate and powerful models. The models may be trained and operated after training, which may occur directly on the same platform in some embodiments with many benefits of being integrated and collaborative, maintained along with the models, scalable, etc. Additionally, or alternatively, the models may be trained and run outside of the service platform using one or more toolkits. The preference of where to run the models may depend on pricing, research vs. commercial, or other criteria.

In some embodiments, where a first instance of a model is stored at a service platform (e.g., stored at one or more databases of the service platform or other storage of the service platform), model subsystem 114 may generate a second instance of the model. As an example, upon generation of the second instance, the first and second instances of the model may be stored at the service platform. As another example, one or more instances of the model may be stored at the service platform as one or more versions of the model (e.g., designated at the service platform as different versions of the same model). In one use case, a user may leverage the benefits of another user's model by copying the other user's model in a procedure called "forking" (e.g., creating a separate instance of the other user's model at the service platform). The user may be allowed to mark the forked version of the other user's model as public or private to continue improving it. In another use case, just like a branch of model versions can be merged into another branch, a forked model may be pushed back to the original model from which it was forked in order to start a review process.

In some embodiments, one or more operations or features of a service platform described herein may include a pull request or model/data/concept review, deep linking, commenting, looking at the current state of any given branch, coding versions of models, exploring other users' code and productivity on the service platform, team/organization management, or other operations or features. As an example, a pull request or model/data/concept review may enable a collaborator to do several things before merging changes into another branch, such as (i) having another collaborator review the changes by reading the pull request, commenting on it and suggesting any changes to improve the changes before merging it, (ii) running automated tests again for that branch of changes (e.g., code or other changes) before it is merged into the other branch, or (ii) taking other actions. With respect to deep linking, a user interface of the service platform may enable users to link different models, versions of the same model, training or other data that is to be provided as input to a model, or other items to one another.

In some embodiments, where a first instance of a machine learning model is stored at a service platform, model subsystem 114 may provide training item information (e.g., input/output information derived from the machine learning models or other training information) as input to a second instance (of the machine learning model) to train the second instance. As an example, the training causes updating of the second instance (e.g., the second instance may learn based on the inputs and outputs derived from other instances of machine learning models). In some embodiments, model subsystem 114 may update the second instance based on changes for the machine learning model (e.g., code changes, architecture changes, training parameter changes, data changes, etc., provided by users of the service platform). In some implementations, model subsystem 114 may analyze performance of the updated second instance (e.g., accuracy, speed, costs, or other performance criteria associated with the updated second instance). As an example, a review processing for accepting changes to a model may not be just looking at code that has change (e.g., which may be a part of the process), but may also involve review of training data that went into training/updating the new instance of the model. In one use case, one or more automated tests may be executed against the new instance of the model to validate that the new instance is making the same or better predictions, as compared to the instance of the same machine learning model from which the new instance was generated. In some cases, one or more scores may be generated from such tests based on accuracy, speed, cost (e.g., loss function value), or other performance criteria. In some cases, an evaluation set of data may be held out from training to ensure unbiased evaluation of the scores. In some cases, changes to a model may be automatically merged with an original instance of the machine learning model if the scores of the new instance are an improvement over corresponding scores of the original instance of the machine learning model. The automatic merge operation may, for example, be a default preference or a user-selected preference, where the merge operation is performed without the need for subsequent user approval of the merge operation (after the tests are executed on the new instance) if the scores of the new instance are an improvement over corresponding scores of the original instance.

In some embodiments, with respect to the updated instance of the machine learning model, one or more machine learning models (e.g., hosted at the service platform or elsewhere) may (i) generate the second instance of the machine learning model, (ii) provide the input/output information as input to the second instance of the machine learning model to train the second instance of the machine learning model, (iii) obtain code information and update the second instance based on the code information, (iv) analyze the performance (e.g., accuracy, speed, cost, etc.) of the updated second instance of the machine learning model, (v) cause, based on the analyzed performance, the updated second instance of the machine learning model to be stored at the service platform as a version of the machine learning model, or (vi) perform other operations. In some embodiments, one or more machine learning models (e.g., hosted at the service platform or elsewhere) may select the input/output information (from a collection of training data as training data to be provided as input to the second instance of the machine learning model) based on (i) input items of the input/output information matching one or more input data types compatible with the second instance, (ii) outputs of the input/output information matching one or more output data types compatible with the second instance, (iii) the input/outputs of the input/output information being provided to or derived from machine learning models that are associated with one or more domains matching one or more domains of the second instance, (iv) the input/outputs of the input/output information being provided to or derived from machine learning models that have identifiers that match an identifier of the second instance, (v) the input/outputs of the input/output information being associated with one or more concepts matching one more concepts that is to be learned by the second instance, or (vi) other criteria. As an example, the machine learning models performing the foregoing operations may be at least a part of model subsystem 114 or separate from model subsystem 114.

In some embodiments, one or more machine learning models (e.g., that is at least a part of model subsystem 114, separate from model subsystem 114, hosted at the service platform, hosted elsewhere from the service platform, etc.) may merge the changes/updates of the second instance of the machine learning model with the first instance of the machine learning model based on the analyzed performance. In some embodiments, one or more machine learning models may replace the first instance of the machine learning model with the second instance of the machine learning model at the service platform. As an example, upon replacement, the first instance may not be available to one or more users (e.g., all users, only accessible by certain users, etc.). As another example, upon replacement, the first instance may be available to owners of the machine learning model or the first instance. As another example, upon replacement, the first instance may only be available to administrators of the service platform. In some embodiments, one or more automated tests may be executed against the second instance to validate that the second instance is making the same or better predictions, as compared to the first instance of the same machine learning model. In some cases, one or more scores may be generated from such tests based on accuracy, speed, cost (e.g., loss function value), or other performance criteria. In some cases, the automatic merge or replacement operation may, for example, be a default preference or a user-selected preference, where the merge or replacement operation is performed without the need for subsequent user approval of the merge or replacement operation (after the tests are executed on the second instance) if the scores of the second instance are an improvement over corresponding scores of the first instance of the machine learning model. In this way, for example, better performing machine learning models (or other prediction models) may quickly and automatically be developed via the service platform's collection of training data (e.g., training data derived from other machine learning models or other training data), thereby providing users with such better performing machine learning models (or other prediction models), and incentivizing users to share their data (e.g., inputs provided to and outputs derived from their models) which may be used by the service platform as training data for other users' models (e.g., machine learning models and/or non-machine-learning models).

In some embodiments, service interface subsystem 112 may obtain a request for information to train a machine learning model. Model subsystem 114 may select input/output information (from a collection of training data) based on the request parameters, and provide the input/output information to train the machine learning model. As an example, the machine learning model may be stored as an instance (of the machine learning model) at the service platform (e.g., stored at one or more databases of the service platform or other storage of the service platform), stored as an instance at elsewhere from the service platform (e.g., stored at a database other than a database of the service platform), etc. The request may include one or more request parameters. The request parameters may include (i) a parameter indicating a domain associated with the machine learning model, (ii) a parameter indicating an input data type associated with the machine learning model, (iii) a parameter indicating an output data type associated with the machine learning model, (iv) a parameter indicating an identifier associated with the machine learning model, (v) a parameter indicating a requested concept on which the machine learning model is to be trained, or (vi) other parameter. The input/output information may be selected (to be provided to train the machine learning model) based on (i) input items of the input/output information matching one or more request parameter input data types, (ii) outputs of the input/output information matching one or more request parameter output data types, (iii) the input/outputs of the input/output information being provided to or derived from machine learning models that are associated with one or more domains matching one or more request parameter domains, (iv) the input/outputs of the input/output information being provided to or derived from machine learning models that have identifiers that match the request parameter identifier, (v) the input/outputs of the input/output information being associated with one or more concepts matching one more request parameter concepts, or (vi) other criteria. In some embodiments, one or more machine learning models (e.g., hosted at the service platform or elsewhere) may (i) select the input/output information to be provided as input to the machine learning model to train the machine learning model, (ii) obtain code information and update the machine learning model based on the code information, (iii) analyze the performance (e.g., accuracy, speed, cost, etc.) of the updated machine learning model, (iv) cause, based on the analyzed performance, the updated machine learning model to be stored at the service platform (e.g., as a version of the machine learning model), or (v) perform other operations.

AI Development via User-Selectable/Connectable Model Representations

In some embodiments, system 100 may facilitate generation of one or more prediction-model-incorporated software applications via user-selectable/connectable model representations. As an example, the software applications may include one or more neural-network-incorporated software applications, other machine-learning-model-incorporated software applications, or other prediction-model-incorporated software applications. The software applications may be stored and executed at a service platform of system 100 (or in the "cloud") or stored and executed at one or more computer systems external to the service platform (e.g., stored and executed at client devices 104 if the service platform is hosted at server(s) 102, or stored and executed at other computing devices, such as other mobile devices, Internet-of-Things devices, etc.). In some embodiments, one or more service platforms described herein may provide one or more user interfaces that present one or more options to select/access the model representations. Responsive to user selection of such options, the selected model representations may be presented on the user interface. As an example, the model representations may include a first prediction model representation corresponding to a first prediction model, a second prediction model representation corresponding to a second prediction model, one or more non-prediction-model representations corresponding to one or more non-prediction models, or other prediction or non-prediction model representations.

In some embodiments, a service platform may provide one or more application program interface (API) services, which provide developers and their applications with access to features of such services' APIs that may be incorporated at least part of such applications. As an example, a graph of arbitrary data workflow methods that incorporate artificial intelligence blocks with other processing operations may be built via the service platform's user interface to meet an entire application or enterprise need. Such workflows may be configured via a user interface and a corresponding API to enable developers to embed features of prediction models in their applications (e.g., as API calls to the prediction models to provide input to and obtain outputs from the prediction models or workflow incorporating the prediction models). In some embodiments, the service platform may facilitate collaboration among multiple users by enabling multiple users to supplement or otherwise modify the same workflow, including (i) adding prediction models or other processing operations to a workflow, (ii) removing prediction models or other processing operations from the workflow, (iii) commenting on portions of the workflow (e.g., commenting on a particular prediction model or other processing operation, commenting on a group of prediction models and other processing operations, etc.), (iv) setting inputs and outputs for prediction models and other processing operations of the workflow, or (v) other operations. In some embodiments, the prediction models of a workflow (or instances of the prediction models) may learn from the data that they process (e.g., inputs provided by users of applications in which the prediction models are incorporated, inputs provided by other components of the applications in which the prediction models are incorporated, feedback information related to the outputs derived from the prediction models' processing of the foregoing inputs, etc.).

In some embodiments, system 100 may cause user-selectable model representations, input/output representations, or other representations to be available via a user interface. Based on user input indicating selection of one or more model or input/output representations, system 100 may cause a presentation of the model representations, input/output representations, or other representations. Additionally, or alternatively, based on the user input or subsequent user-initiated changes related to the representations, system 100 may generate at least a portion of a software application. As an example, responsive to the generation, the resulting software application may include one or more instances of machine learning models or non-machine-learning models that correspond to the presented model representations, one or more input/output paths between respective ones of the models or from/to other sources/destinations, or other components. In one use case, suppose a user wishes to use an API service's general image classification model and face detection model to find scenes containing a certain number of people in outdoor settings in a stream of images from a social media service. With typical existing systems, the user is required to write a significant amount of code to run on their server to fetch a set of images, make multiple separate requests to the API service to apply each model to the image, and then decide if each image matches the criteria based on whether the probability for the tag "outdoors" exceeds a threshold designated by the user. Instead, in some embodiments, the user may define all of the foregoing steps through a web or other user interface of an API service, where the API service (or its service platform) fetches images from the stream on behalf of the user and sends images matching the criteria to the user's server. As such, the user's use of system 100 decreases the complexity of the user's application code that they run on their server, while also making it easier and quicker for the user to develop the application.

Figure 3A:
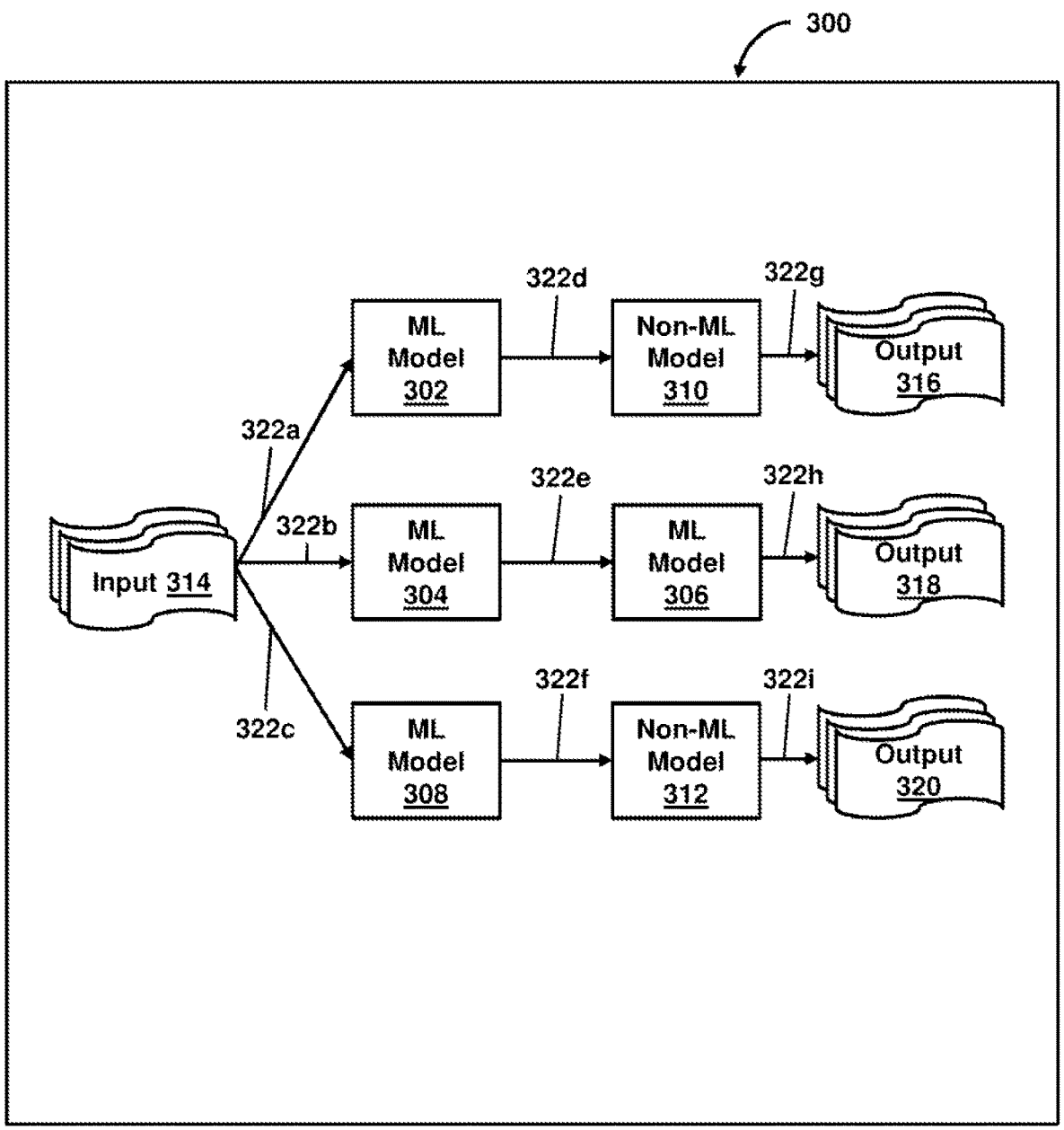
FIGS. 3A-3C show a user interface for generating a ML-model-incorporated software application via user-selectable/connectable model representations, in accordance with one or more embodiments.
Figure 3B:
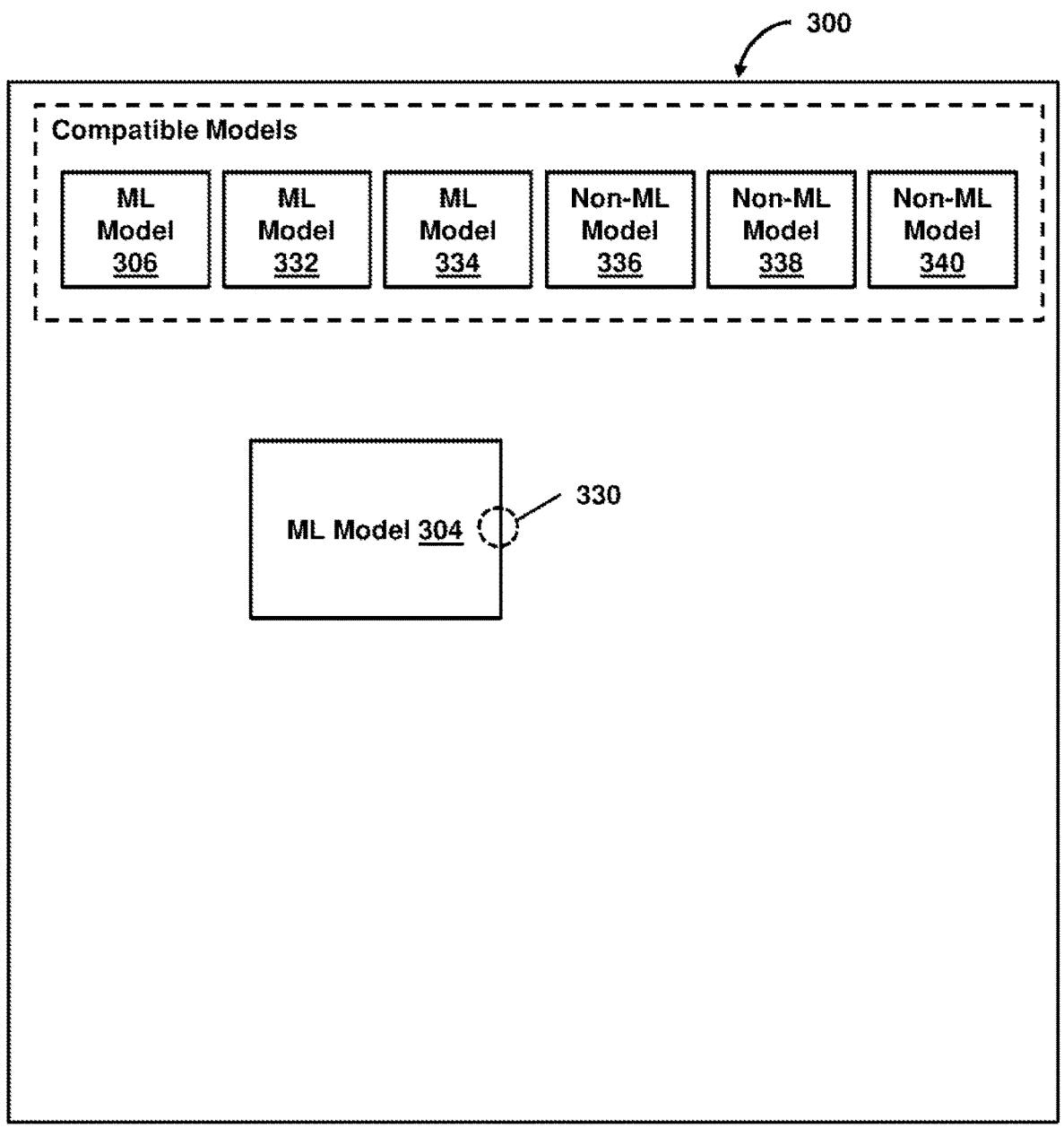

In some embodiments, a user may download and integrate an API client into the user's application. In some embodiments, the application may utilize the API client to make calls to one or more workflows created via system 100's service platform or user interface thereof. As an example, a single call to a workflow may cause multiple machine learning models of the workflow to be executed. The single call may cause a first machine learning model of the workflow to process one or more inputs and provide its outputs as inputs to one or more other machine learning models or non-machine-learning models, and cause those other machine learning models or non-machine-learning models to process the first machine learning model's outputs and provide their outputs to other components of the workflow or to the application (e.g., via the API client or other component of the application). In one use case, with respect to FIG. 3A, user interface 300 of a service platform displays representations of components related to functionalities to be provided via an application. For example, such components include machine learning models 302, 304, 306, and 308, non-machine-learning models 310 and 312, designated input sources (or type) 314, designated output destinations (or type) 316, 318, and 320, and input/output paths 322. As indicated, an application's single call to the set of represented components may cause one or more inputs to be provided to machine learning model 302, machine learning model 302's output to be provided to non-machine-learning model 310, and non-machine-learning model 310's output to be provided to one or more output destinations (e.g., back to the application, a database or other storage associated with the application, a third party destination, etc.). Additionally, or alternatively, an application's single call to the set of represented components may cause one or more inputs to be provided to machine learning model 304, machine learning model 304's output to be provided to machine learning model 306, and machine learning model 306's output to be provided to one or more output destinations (e.g., back to the application, a database or other storage associated with the application, a third party destination, etc.).

In some embodiments, building blocks of a workflow may include a set of operation blocks for processing inputs and creating outputs to be passed into other stages of the workflow. Some examples of these operation blocks include (i) machine learning models, (ii) conditional statements to decide whether an output should pass to a next stage or which block to pass the output, (iii) mathematical/statistical models, (iv) image/video/audio/text/other data processing operation blocks, (v) operation blocks to initiate requests to third party APIs or programs, (vi) user-interface-related operation blocks (e.g., which cause one or more interactive features of a user interface), (vii) notification operation blocks (e.g., which cause one or more notifications to be sent or presented), (viii) WebHooks to call another server or service, (ix) connection-related operation blocks (e.g., which initiates a connection to Internet-of-things devices, such as microphones, cameras, etc.), (x) data ingestion operation blocks (e.g., obtains data from sources, such as cloud storages, social media platforms, etc.), or (xi) other operation blocks. In some embodiments, the processing of the workflow may occur in the cloud (e.g., at a particular service platform), on a local device (e.g., at least partially performed on a local device hosting the application that incorporates the workflow), or on multiple devices (e.g., at least partially performed on the local device or other devices).

In some embodiments, a user can create a new workflow by leveraging APIs to compose different operation blocks together. The configuration may include the output of one operation block feeding into the input of another operation block. Configuring a list of operation blocks defines a graph that can then be run. The input to the overall graph may be provided to a first set of operation blocks that do not have another input defined. The output of the graph may be a set of outputs that are not connected to other operation blocks. In some embodiments, intermediate computed operation outputs may be returned to a user or an application in which the workflow is incorporated). By using the workflow, a developer (or other user) may significantly reduce the amount of programming code that he/she needs to write or review to develop an application with the features and functionalities that the developer desires. Moreover, a user interface of system 100 may guide the developer to select and connect operation blocks that are compatible with one another, thereby reducing errors resulting from application component incompatibility. The user interface (or its associated service platform) may provide a developer with a set of compatible options when the developer selects an operation block that he/she wants to input to, output to, or otherwise extend. Additionally, or alternatively, the user interface may prevent a developer from connecting two operation blocks that are not compatible with one another. Compatibility may, for example, be determined based on input/output data types of the operation blocks. As an example, if a developer tries to add a block that takes as input the output of a previous block, the blocks may be determined to be compatible responsive to the input data type/format of that block and the output data type/format of the previous block being of the same data type/format. That simple check, in addition to other checks for constraints (e.g., such as where the processing of each block is happening or other checks), facilitates workflow operations.

In one scenario, for example, a workflow may include three (or more) branches, where (i) a first branch includes a moderation model (e.g., to detect unwanted content or perform other detections), a threshold score comparison model, and a confirmation moderation queue (e.g., a queue of inputs to be checked by a human moderator or other user, a queue of inputs to be re-checked by one or more machine learning models, etc.), (ii) a second branch includes an object recognition model and a search index database, and (iii) a third branch includes a third-party API model (or an operation block that sends a request to the third-party API model and is returned a response to the request) and another operation block. As an example, the moderation model and the object recognition model may be machine learning models. When an input image is provided as input to the workflow, the input image is provided as input to the moderation machine learning model, the object recognition model, and the third-party API model. If the moderation model outputs a score based on its processing of the input image, and the threshold score comparison model determines that the score does not satisfy a threshold score (e.g., not equal to or greater than 0.9 or other threshold), the threshold score comparison model may cause the input image to be added to the confirmation moderation queue. The object recognition model processes the input image to predict one or more concepts in the input image and indexes its predicted concepts in the search index database (e.g., so that the concepts are available for use to identify that input image for responding to one or more future searches related to such concepts). The third-party API model may be called (e.g., via a request to the third party API model that includes the image or a link to the image), and the third party API model's response may be combined with the original input image and passed to one or more operation blocks for further processing. As an example, the third party API model may be related to a service that checks images against a database of copyright images, and the third party API model may return an indication of whether the input image is likely subject to a copyright, information indicating what entities the copyright belongs, or other information.

In some embodiments, service interface subsystem 112 may cause user-selectable model representations, input/output representations, or other representations to be available via a user interface. As an example, one or more options to select/access the representations may be presented on the user interface. Responsive to user selection of such options, the corresponding representations may be presented on the user interface. The model representations may include a first machine learning model representation corresponding to a first machine learning model, a second machine learning model representation corresponding to a second machine learning model, one or more non-machine-learning model representations corresponding to one or more non-machine-learning models, or other machine learning or non-machine learning model representations. The input/output representations may include (i) connection components corresponding to one or more input/output data paths between the machine learning models or the non-machine-learning models, (ii) connection components corresponding to input sources (e.g., the application that incorporates such models, third party input sources, etc.), (iii) connection components corresponding to output sources (e.g., the application that incorporates such models, third party output sources, etc.), (iv) representations corresponding to input or output data types compatible with such models, or (v) other representations.

As an example, service interface subsystem 112 may obtain, via the user interface, user input indicating (i) selection of the first machine learning model representation, the second machine learning model representation, and a non-machine-learning model representation corresponding to a non-machine-learning model, (ii) connection of the first machine learning representation to at least one other model representation (e.g., the second machine learning model representation, the non-machine-learning model representation, etc.), or (iii) other parameters. In one use case, with respect to FIG. 3A, user interface 300 may present machine learning model representation 304 on the user interface 300. Upon the user's activation of an output-associated region (of machine learning model representation 304), user interface 300 may be caused to present options for representations of compatible models (or other components) that are configured to take the corresponding machine learning model's outputs as inputs and process such inputs. Such representations include machine learning model representation 306 and models 332-340 (which include machine learning models and non-machine learning models).

As another example, based on the user input (e.g., indicating the user's selection of models or other components), presentation subsystem 118 may cause, via the user interface, a presentation of (i) the first machine learning model representation, the second machine learning model representation, and the non-machine-learning model representation, (ii) a connection component shared between the first machine learning model representation and the other model representation, or (iii) other representations. Additionally, or alternatively, based on the user input or other user-initiated changes related to the representations, application integration subsystem 120 may generate at least a portion of an application. As a further example, the application may include (i) an instance of the first machine learning model, an instance of the second machine learning model, and an instance of the non-machine-learning model, (ii) an input/output data path between the instance of the first machine learning model and at least one other instance, or (iii) other components. In one use case, at least a portion of the application may be generated by (i) generating a specific API client that is to be integrated with the application (e.g., such that the application uses the API client to make calls to the machine learning models or non-machine-learning models), (ii) generating an identifier for the workflow (that includes the models and input/output data path(s)) or code that is to be used by a generic API client to make calls to the workflow, (iii) generating code that is to be used by the application to make calls to the workflow, or (iv) providing other techniques to enable the application to make calls to the workflow or models. In another use case, the application itself may contain code and related data of the model instances and input/output data path(s).

In some embodiments, for operation blocks that require an external source of data or a request to be made to a third party API, service interface subsystem 112 may require a user to provide additional authentication. For example, if data is to be downloaded from a cloud storage provider service, the operation block may enable the user to specify the user's login credentials to that cloud storage provider service via the user interface representation corresponding to the operation block (e.g., a login page within the block in the user interface or other technique). As another example, service interface subsystem 112 may require the user to provide other information to get the desired operation of that external resource. Such information may include (i) which files or what type of files are to be provided as input to the workflow (e.g., by specifying file name, parameters that files must match, file data type, etc.), (ii) how many of such files to process at any given time (e.g., batch mode), (iii) permission role to assume in order to access the data provided to the workflow or derived from the workflow, (iv) encryption options for such data, or (v) other information. In some embodiments, with respect to third party APIs being called via the workflow, the configuration format may be include JSON, XML, or other data format configuration to specify (i) things for the API endpoint to call, (ii) authentication parameters to use for a user account with that third party service, (iii) the request format for that third party service, (iv) the payload of data to send in the request, (v) the response format to expect from the service, or (vi) other information. This generalization of a third party API would allow the user to ultimately provide the specification and to call any API outside of the workflow and chain inputs to send in the request and get a response back that flows into the outputs of that operation block in the workflow. In some embodiments, in addition or as an alternative to calling third party APIs, users may configure blocks to call other artificial intelligence toolkits. The configuration of such an operation block may be a graph definition for these toolkits. Embedding a toolkit operation would extend the functionality of these toolkits to make them far more expressive, powerful, and easy to use for general processing needs of any application or enterprise.

In some embodiments, service interface subsystem 112 may make available an option for one or more customizable models (or operation blocks) via a user interface. As an example, in addition to specific machine learning models or other models offered by a service platform of system 100 or a third party service platform, service interface subsystem 112 may provide model representations corresponding to the customizable models, which enables the user to define the input and output data type/format, how the input is processed to produce the output, or other parameters. In some embodiments, service interface subsystem 112 may provide one or more modules/sub-modules for a user to select to build the customizable models. In this way, for example, a developer may create customizable models via the user interface to provide a workflow (or other group of components) with features and functionalities that may not already be available via a service platform of system 100 or a third party service platform. In some embodiments, once a new model is created, the model may be publically available to users of a service platform or limited for use by certain users of the service platform (e.g., members of an organization or group, specified users, etc.).

Model Training Via Reference Feedback

In some embodiments, model subsystem 114 may enable one or more machine learning models to be trained with respect to a workflow or other arrangement of the machine learning models. In some embodiments, the machine learning models of a workflow may be trained/re-trained/further trained subsequent to being added to the workflow and prior to being incorporated as at least part of an application being developed. In some embodiments, the machine learning models of the workflow may be trained/re-trained/further trained subsequent to being added to the workflow and subsequent to being incorporated as at least part of the application. Training data used to train the machine learning models may include (i) inputs to be provided to a machine learning model (e.g., inputs provided to and processed by other machine learning models or other inputs), (ii) reference outputs that are to be derived from a machine learning model's processing of such inputs (e.g., user-confirmed or user-provided outputs, outputs confirmed through one or more machine learning models' processing of such inputs, outputs confirmed multiple times by processing of such inputs by respective sets of machine learning models, or other reference outputs), (iii) reference indications of outputs that are not to be derived from a machine learning model's processing of such inputs (e.g., user indications that such outputs are inaccurate or other reference indications), or (iv) other training data. In some embodiments, subsequent to such training of the machine learning models, the updated machine learning models may be publically available to users of a service platform or limited for use by certain users of the service platform (e.g., members of an organization or group, specified users, etc.).

Figure 3C:
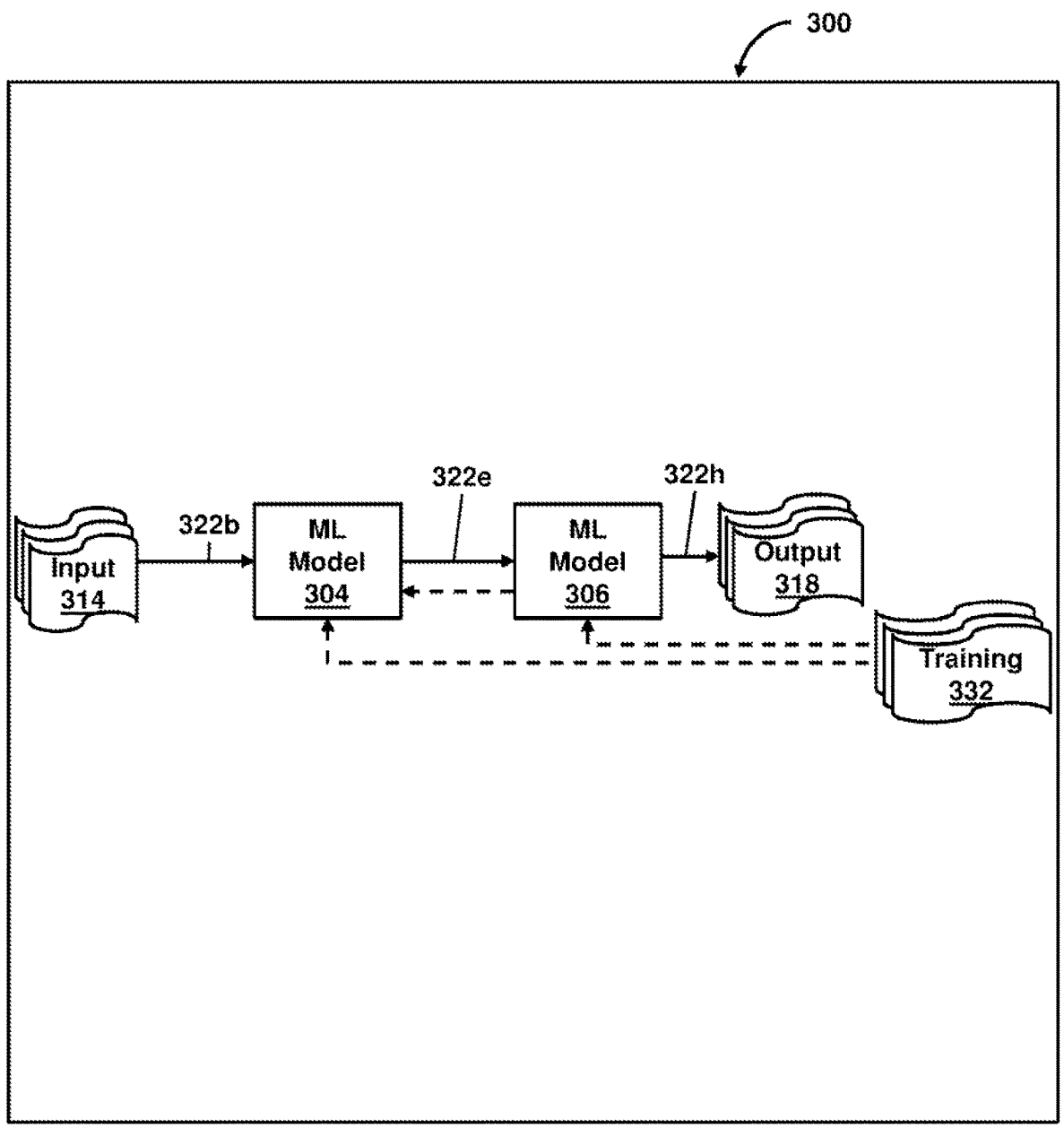

In some embodiments, with respect to FIG. 3C, training data may be provided to one or more machine learning models (or instances thereof) represented in user interface 300 in accordance with their arrangement with one another to train the machine learning models. As an example, unsupervised training of machine learning models 304 and 306 may be performed by providing inputs to machine learning model 304, which may learn based on the provided inputs and its processing of the provided inputs (e.g., without machine learning model 304 being provided any evaluation data to assess the accuracy of its subsequent output). Based on the arrangement of machine learning models 304 and 306 in the workflow shown in FIG. 3C, the output of machine learning model 304 is provided as input to machine learning model 306, which may also learn based on the output of machine learning model 304 and machine learning model 306's processing of such output (e.g., without machine learning model 306 being provided any evaluation data to assess the accuracy of its subsequent output).

As another example, also with respect to FIG. 3C, feedback subsystem 116 may obtain input/output information (e.g., training data 332), and model subsystem 114 may provide the input/output information as training data to one or more machine learning models (or instances thereof) represented in user interface 300. The input/output information may include (i) information related to first items to be provided as input to the machine learning models (or previously provided as input to one or more other machine learning models), (ii) information related to first prediction outputs (or other outputs) derived from the other machine learning models' processing of the first items, or (iii) other information. As a further example, the machine learning models may learn from a mapping of inputs and outputs, such as pairs of (input, output) so that they can update their respective parameters to improve their recognition of patterns and produce better predictions. With respect to the workflow, information, such as reference inputs, reference outputs, or other reference indications, may flow or be processed "backwards" to cause the machine learning models to learn from the reference indications. As such, the machine learning models may be configured to process such reference indications from output to input to pass back its processing of the reference indications through the workflow.

In one use case, with respect to FIG. 3C, model subsystem 114 may cause one or more reference prediction outputs to be provided to machine learning model 306. The reference prediction outputs may include reference prediction outputs that are to be derived from one or more models' processing of reference inputs. The reference prediction outputs may include user-confirmed or user-provided outputs for the reference inputs, outputs confirmed through one or more machine learning models' processing of such reference inputs, outputs confirmed multiple times by processing of such reference inputs by respective sets of machine learning models, etc. Upon being provided the reference prediction outputs, machine learning model 306 processes the reference prediction outputs to predict those outputs' corresponding inputs (also referred to in this paragraph as "intermediate reference prediction outputs") (e.g., what inputs would have produced those reference prediction outputs had they been provided to machine learning model 306 for processing). The intermediate reference prediction outputs may then be provided to machine learning model 304, which processes the intermediate reference outputs to learn and update itself. In some cases, in order to learn from the intermediate reference outputs, machine learning model 304 may process the intermediate reference outputs to arrive those intermediate output's corresponding inputs such that those intermediate output's corresponding inputs matches the reference inputs (e.g., the corresponding inputs are the same or similar to the reference inputs).

In another use case, model subsystem 114 may provide one or more reference indications of outputs (that are not to be derived from a machine learning model's processing of such reference inputs) to machine learning model 306. Such reference indications may include user indications that such outputs are inaccurate (e.g., a reference prediction output indicating that a reference image corresponds to the concept "dog" would be indicated as "Not Correct" if the reference image is an image of a baby bear and not a dog) or other reference indications (e.g., reference indications generated by one or more machine learning models). Upon being provided the reference indications (e.g., one or more inaccuracy indications, one or more prediction outputs indicated as being inaccurate, etc.), machine learning model 306 processes the reference indications to predict corresponding inputs that would have produced accurate prediction outputs had machine learning model 306 processed the corresponding inputs (also referred to in this paragraph as "intermediate reference prediction outputs") (e.g., what inputs would have produced the accurate prediction outputs had they been provided to machine learning model 306 for processing). The intermediate reference prediction outputs may then be provided to machine learning model 304, which processes the intermediate reference outputs to learn and update itself. In some cases, in order to learn from the intermediate reference outputs, machine learning model 304 may process the intermediate reference outputs to arrive those intermediate output's corresponding inputs such that those intermediate output's corresponding inputs matches the reference inputs (e.g., the corresponding inputs are the same or similar to the reference inputs).

In another use case, with respect to FIG. 3C, where machine learning model 304 is a cropping/bounding model, and machine learning model 306 is an object recognition model, images are provided as input to the cropping/bounding model. The cropping/bounding model may process the images to identify where objects of interest within each image are located, and may output one or more bounding boxes for each image (e.g., if any objects of interest are predicted to exist in the image) or cropped images that include one or more objects of interest. In this way, for example, the cropping/bounding model may reduce the amount of processing that the object recognition model has to perform by reducing the size of the image or areas that is to be processed by the object recognition model (e.g., the object recognition model need only process the areas within the bounding boxes of each image or the smaller cropped images). Based on its processing, the object recognition model may output predictions of objects that exist in each of the image inputs. If, for example, the object recognition model's prediction with respect to a given image input is determined to be inaccurate, model subsystem 114 may cause the image input and a reference output indication (e.g., an accurate prediction for the image input, the inaccurate prediction and an indication that the prediction is inaccurate, etc.) to be provided to the object recognition model. Upon being provided the reference output indication and the input image, the object recognition model processes the reference output indication to predict the corresponding bounding boxes or cropped images that would have produced an accurate prediction had the object recognition model processed such bounding boxes or cropped images (e.g., what bounding boxes or cropped images would have produced the accurate prediction had they been provided as input to the object recognition model). The input image and the predicted bounding boxes or cropped images may then be provided to the cropping/bounding model, which processes the predicted bounding boxes or cropped images to learn how it should have processed the image input to arrive at the object recognition model's predicted bounding boxes or cropped images.

In some embodiments, wherein an application incorporates an instance of a machine learning model, model subsystem 114 may provide a given input to the machine learning model (or the instance thereof) to cause the machine learning model (or the instance thereof) to generate a prediction output. Feedback subsystem 116 may obtain a reference indication corresponding to (i) the prediction output, (ii) a derivative of the prediction output, or (iii) a derivative of the given input. Model subsystem 114 may cause the application's instance of the machine learning model to be updated based on the reference indication, the given input, or other item. As an example, the reference indication may include a reference output that is an accurate output derived from the machine learning model's processing of the given input, a reference indication of an inaccurate output that should not be derived from the machine learning model's processing of the first input, a reference indication of whether the prediction output is accurate or inaccurate (or the extent to which the prediction output is accurate or inaccurate), or other reference indication. A determination of accuracy of an output may be based on a user-confirmed or user-provided output, an output confirmed through one or more machine learning models' processing of the given input, an output confirmed multiple times by processing of the given input by respective sets of machine learning models, or other reference output. A determination of inaccuracy of an output may be based on a user-confirmed or user-provided indication that the output is inaccurate, an indication of inaccuracy confirmed through one or more machine learning models' processing of the given input, an indication of inaccuracy confirmed multiple times by processing of the given input by respective sets of machine learning models, or other indication.

In some embodiments, a first instance of a machine learning model (of an application) may generate a prediction output based on a given input provided to the first instance of the machine learning model. In some embodiments, model subsystem 114 may cause updating of the application's instance of the machine learning model by providing the given input and a reference indication together as input to at least one instance of the machine learning model. As an example, the reference indication may correspond to the prediction output, a derivative of the prediction output, or a derivative of the given input. In some embodiments, model subsystem 114 may provide the given input and the reference indication to the first instance of the machine learning model to cause the first instance to be updated based on the given input and the reference indication. In some embodiments, model subsystem 114 may provide the given input and the reference indication to a second instance of the machine learning model (different from the first instance of the machine learning model). Model subsystem 114 may cause updating of the application's instance of the machine learning model by replacing, for the application, the first instance of the machine learning model with the second instance of the machine learning model. In this way, for example, the application may continue to operate simultaneously (e.g., using the first instance of the machine learning model) while the second instance of the machine learning model is being updated by training the second instance on training data (e.g., the given input, the reference indication, or other training data). As discussed, in some cases with respect to a workflow (e.g., that includes multiple machine learning models in a given branch), such updating/training may be performed by causing the training data to be processed "backwards" to cause the machine learning models to learn from the reference indications.

In some embodiments, wherein an application incorporates an instance of a first machine learning model, an instance of a second machine learning model, or one or more instances of other machine learning models, model subsystem 114 may provide a first input to the first machine learning model (or the instance thereof) to cause the first machine learning model (or the instance thereof) to generate a first prediction output. Model subsystem 114 may provide a second input to the second machine learning model (or the instance thereof) to cause the second machine learning model (or the instance thereof) to generate a second prediction output. As an example, the second input may include the first prediction output (from the first machine learning model) or another output derived from the first prediction output (e.g., the output of another model's processing of the first prediction output, the output of a subsequently model's processing of the other model's output, etc.). In one use case, where the first machine learning model is a cropping/bounding model, and the second machine learning model is an object recognition model, the cropping/bounding model may process one or more images to identify where objects of interest within each image are located. The cropping/bounding model may provide its output to the object recognition model (e.g., one or more bounding boxes for each image, cropped images that include one or more objects of interest, or other output). Based on its processing of the output from the cropping/bounding model, the object recognition model may output predictions of objects that exist in each of the image inputs.

In some embodiments, feedback subsystem 116 may obtain a reference indication corresponding to (i) the second prediction output, (ii) a derivative of the second prediction output, or (iii) a derivative of the first input or the second input. Model subsystem 114 may cause the application's respective instance(s) of the first machine learning model, the second machine learning model, or other machine learning models to be updated based on the reference indication, the first input, the second input, or other item. As an example, the reference indication may include a reference output that is an accurate output corresponding to the second input (e.g., an output that should be derived from the first and second machine learning models' respective processing of the first and second inputs), a reference indication of an inaccurate output that should not be derived from the first and second machine learning models' respective processing of the first and second inputs, a reference indication of whether the second prediction output is accurate or inaccurate (or the extent to which the second prediction output is accurate or inaccurate), or other reference indication.

In some embodiments, a first instance of a first machine learning model (of an application) may generate a first prediction output based on a first input provided to the first instance of the first machine learning model. The first prediction output or a derivative of the first prediction output may be provided to a first instance of a second machine learning model (of the application), and the first instance of the second machine learning model may generate a second prediction output based on the first prediction output (or derivative thereof) provided to the first instance of the second machine learning model. Model subsystem 114 may cause updating of the application's instance of the second machine learning model by providing the first input and a reference indication together as input to at least one instance of the second machine learning model. As an example, the reference indication may correspond to the second prediction output, a derivative of the second prediction output, or a derivative of the first input. In some embodiments, model subsystem 114 may provide the first input and the reference indication to the first instance of the second machine learning model to cause the first instance of the second machine learning model to be updated based on the first input and the reference indication. In some embodiments, model subsystem 114 may provide the first input and the reference indication to a second instance of the second machine learning model (different from the first instance of the second machine learning model) to cause the second instance of the second machine learning model to be updated. Model subsystem 114 may cause updating of the application's instance of the second machine learning model by replacing, for the application, the first instance of the second machine learning model with the second instance of the second machine learning model. In this way, for example, the application may continue to operate simultaneously (e.g., using the first instance of the second machine learning model) while the second instance of the second machine learning model is being updated by training the second instance on training data (e.g., the first input, the reference indication, or other training data).

Additionally, or alternatively, a second instance of the first machine learning model may be generated, and the second instance of the first machine learning model may be updated (e.g., as a result of providing training data to the second instance of the second machine learning model, which causes data to flow "backwards" to the second instance of the first machine learning model). Model subsystem 114 may cause updating of the application's instance of the first machine learning model by replacing, for the application, the first instance of the first machine learning model with the second instance of the first machine learning model. In this way, for example, the application may continue to operate simultaneously (e.g., using the first instance of the first machine learning model) while the second instance of the first machine learning model is updated, thereby reducing downtime in the application's operations.

As discussed, in some cases with respect to a workflow (e.g., that includes multiple machine learning models in a given branch), such updating/training may be performed by causing the training data to be processed "backwards" to cause the machine learning models to learn from the reference indications.

Examples Flowcharts

FIGS. 4-7 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 4:
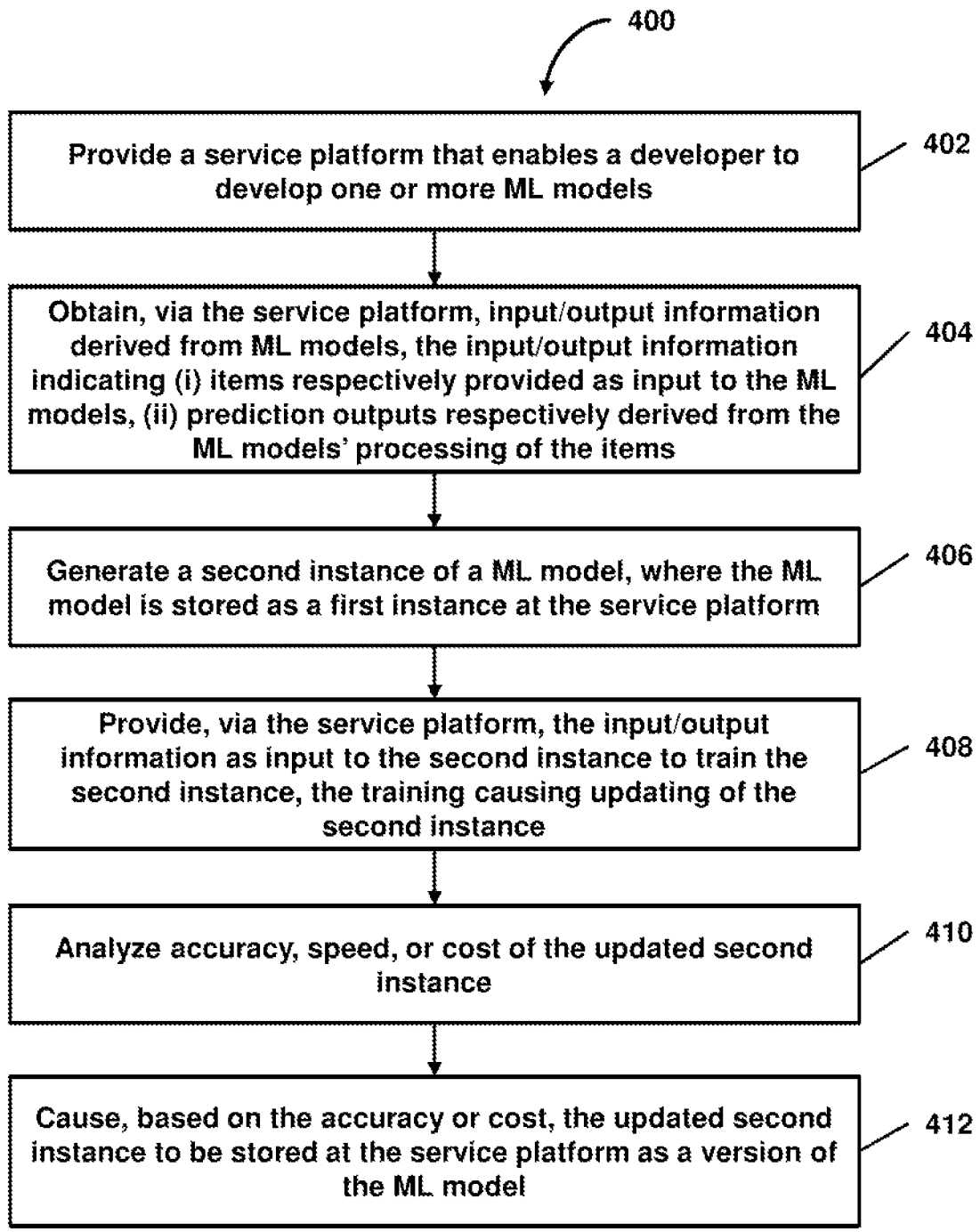
FIG. 4 shows a flowchart of a method of facilitating, via a service platform, development of a machine learning model stored at the service platform, in accordance with one or more embodiments.

FIG. 4 shows a flowchart of a method 400 of facilitating, via a service platform, development of a machine learning model stored at the service platform, in accordance with one or more embodiments. In an operation 402, a service platform that enables a developer to develop one or more machine learning models may be provided. Operation 402 may be performed by a service interface subsystem that is the same as or similar to service interface subsystem 112, in accordance with one or more embodiments.

In an operation 404, input/output information derived from machine learning models may be obtained via the service platform. As an example, the input/output information may include (i) information related to first items provided as input to at least one model of the machine learning models, (ii) information related to first prediction outputs (or other outputs) derived from the model's processing of the first items, (iii) information related to second items provided as input to at least another model of the machine learning models, (iv) information related to second prediction outputs (or other outputs) derived from the other model's processing of the second item, (v) information related to other items provided as machine-learning-model input or other outputs derived from other machine learning models, or (vi) other information. As another example, the input/output information may be obtained from the machine learning models. As another example, the input/output information may be continuously obtained from the machine learning models (e.g., on a periodic basis, in accordance to a schedule, or based on other automated triggers). Operation 404 may be performed by a feedback subsystem that is the same as or similar to feedback subsystem 116, in accordance with one or more embodiments.

In an operation 406, a second instance of a machine learning model may be generated, where the machine learning model is stored as a first instance (of the machine learning model) at the service platform (e.g., stored at one or more databases of the service platform or other storage of the service platform). As an example, upon generation of the second instance, the first and second instances of the machine learning model may be stored at the service platform. As another example, one or more other instances of the machine learning model may be stored at the service platform. As a further example, one or more instances of the machine learning model may be stored at the service platform as one or more versions of the machine learning model. Operation 406 may be performed by a model subsystem that is the same as or similar to model subsystem 114, in accordance with one or more embodiments.

In an operation 408, the input/output information derived from the machine learning models may be provided via the service platform as input to the second instance (of the machine learning model) to train the second instance. As an example, the training causes updating of the second instance (e.g., the second instance may learn based on the inputs and outputs derived from other instances of machine learning models). Operation 408 may be performed by a model subsystem that is the same as or similar to model subsystem 114, in accordance with one or more embodiments.

In an operation 410, accuracy, speed, or cost of the updated second instance may be analyzed. In one use case, one or more automated tests may be executed against the updated second instance of the model to validate that the updated second instance is making the same or better predictions, as compared to the second instance prior to it being updated. In some cases, one or more scores may be generated from such tests based on the accuracy, speed, or cost. Operation 410 may be performed by a model subsystem that is the same as or similar to model subsystem 114, in accordance with one or more embodiments.

In an operation 412, the updated second instance (of the machine learning model) may be caused to be stored at the service platform as a version of the machine learning model based on the accuracy, speed, or cost. As an example, the updated second instance may be saved as an official version of the machine learning model responsive to the scores of the second updated instance being greater than or equal to corresponding scores of the first instance of the machine learning model. Operation 412 may be performed by a model subsystem that is the same as or similar to model subsystem 114, in accordance with one or more embodiments.

Figure 5:
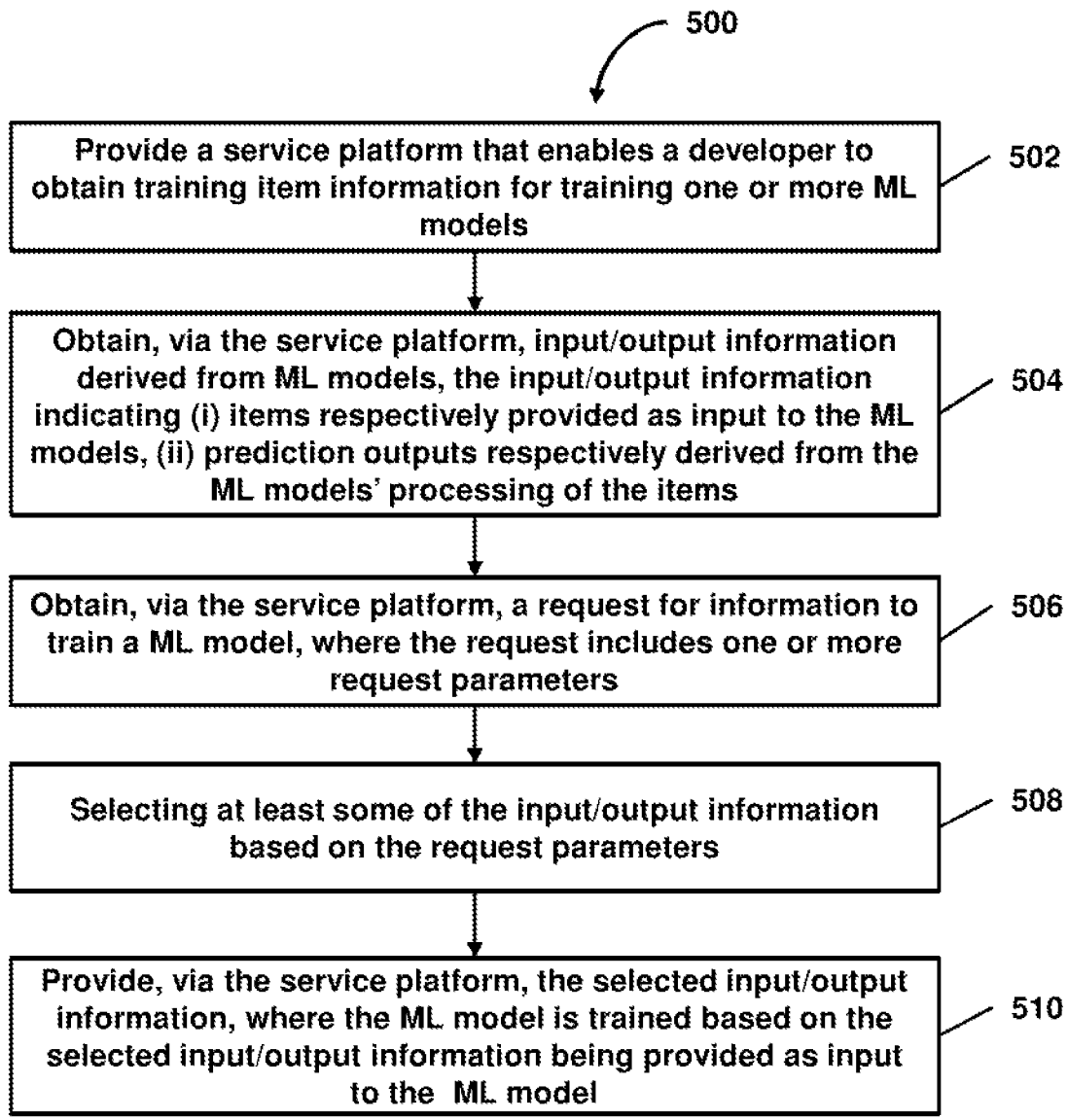
FIG. 5 shows a flowchart of a method of facilitating updating of a machine learning model based on request-selective input/output information derived from other machine learning models, in accordance with one or more embodiments.

FIG. 5 shows a flowchart of a method of facilitating updating of a machine learning model based on request-selective input/output information derived from other machine learning models, in accordance with one or more embodiments. In an operation 502, a service platform that enables a developer to obtain training item information (for training one or more machine learning models) may be provided. Operation 502 may be performed by a service interface subsystem that is the same as or similar to service interface subsystem 112, in accordance with one or more embodiments.

In an operation 504, input/output information derived from machine learning models may be obtained via the service platform. As an example, the input/output information may include (i) information related to first items provided as input to at least one model of the machine learning models, (ii) information related to first prediction outputs (or other outputs) derived from the model's processing of the first items, (iii) information related to second items provided as input to at least another model of the machine learning models, (iv) information related to second prediction outputs (or other outputs) derived from the other model's processing of the second item, (v) information related to other items provided as machine-learning-model input or other outputs derived from other machine learning models, or (vi) other information. As another example, the input/output information may be obtained from the machine learning models. As another example, the input/output information may be continuously obtained from the machine learning models (e.g., on a periodic basis, in accordance to a schedule, or based on other automated triggers). Operation 504 may be performed by a feedback subsystem that is the same as or similar to feedback subsystem 116, in accordance with one or more embodiments.

In an operation 506, a request for information to train a machine learning model may be obtained. As an example, the machine learning model may be stored as an instance (of the machine learning model) at the service platform (e.g., stored at one or more databases of the service platform or other storage of the service platform), stored as an instance at elsewhere from the service platform (e.g., stored at a database other than a database of the service platform), etc. The request may include one or more request parameters. The request parameters may include (i) a parameter indicating a domain associated with the machine learning model, (ii) a parameter indicating an input data type associated with the machine learning model, (iii) a parameter indicating an output data type associated with the machine learning model, (iv) a parameter indicating an identifier associated with the machine learning model, (v) a parameter indicating a requested concept on which the machine learning model is to be trained, or (vi) other parameter. Operation 506 may be performed by a service interface subsystem that is the same as or similar to service interface subsystem 112, in accordance with one or more embodiments.

In an operation 508, at least some of the input/output information may be selected based on the request parameters. As an example, the input/output information may be selected based on (i) input items of the selected input/output information matching one or more request parameter input data types, (ii) outputs of the selected input/output information matching one or more request parameter output data types, (iii) the input/outputs of the selected input/output information being provided to or derived from machine learning models that are associated with one or more domains matching one or more request parameter domains, (iv) the input/outputs of the selected input/output information being provided to or derived from machine learning models that have identifiers that match the request parameter identifier, (v) the input/outputs of the selected input/output information being associated with one or more concepts matching one more request parameter concepts, or (vi) other criteria. Operation 508 may be performed by a model subsystem that is the same as or similar to model subsystem 114, in accordance with one or more embodiments.

In an operation 510, the selected input/output information may be provided via the service platform. The machine learning model may be trained based on the selected input/output information being provided as input to the machine learning model. As an example, the training causes updating of the machine learning model (e.g., the machine learning model may learn based on the inputs and outputs derived from other instances or other machine learning models). Operation 510 may be performed by a model subsystem that is the same as or similar to model subsystem 114, in accordance with one or more embodiments.

Figure 6:
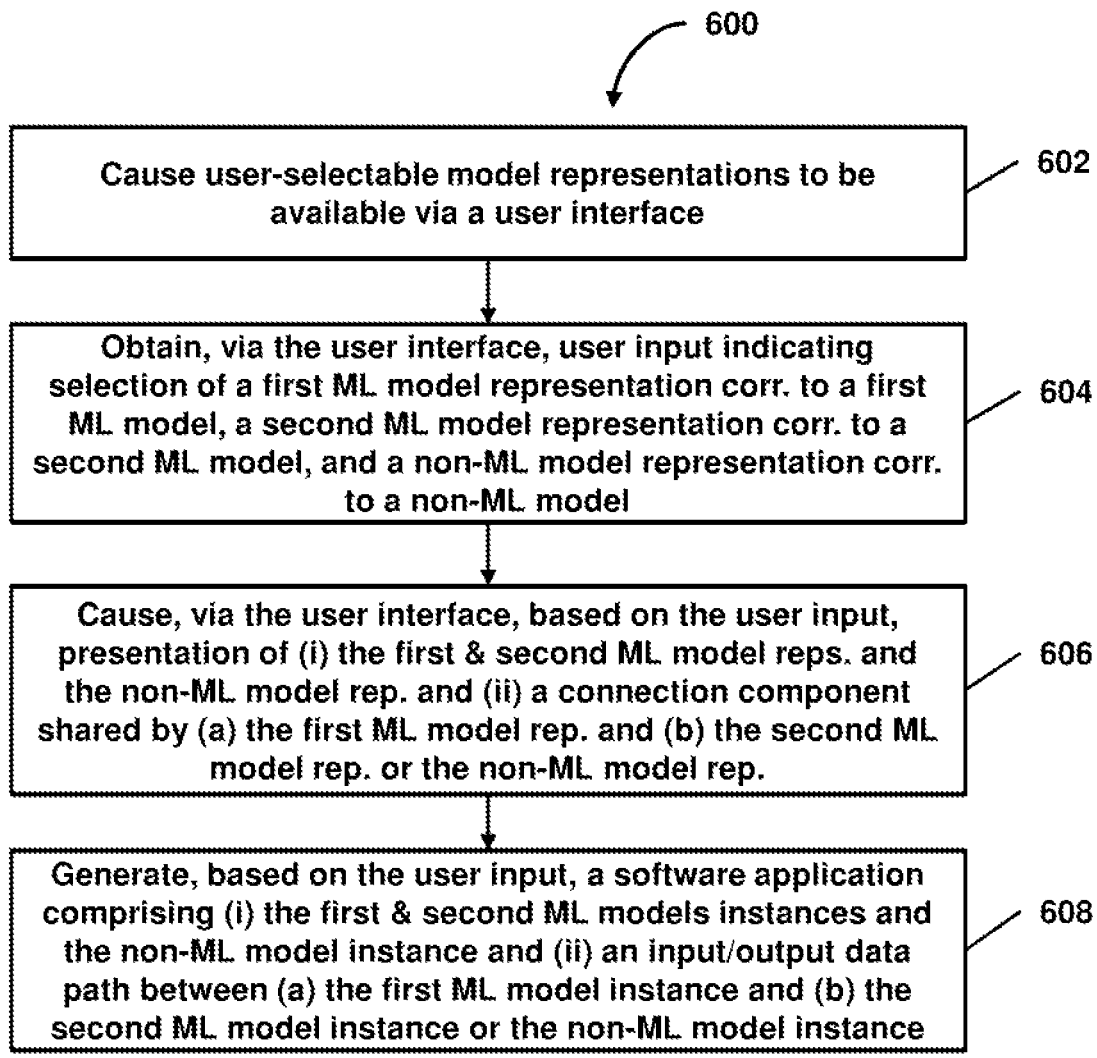
FIG. 6 shows a flowchart of a method of generating a machine-learning-incorporated software application via user-selectable model representations of an interactive user interface, in accordance with one or more embodiments.

FIG. 6 shows a flowchart of a method of generating a machine-learning-incorporated software application via user-selectable model representations of an interactive user interface, in accordance with one or more embodiments. In an operation 602, user-selectable model representations may be caused to be available via a user interface. As an example, one or more options to select/access the user-selectable model representations may be presented on the user interface. Responsive to user selection of such options, the corresponding model representations may be presented on the user interface. The model representations may include a first machine learning model representation corresponding to a first machine learning model, a second machine learning model representation corresponding to a second machine learning model, one or more non-machine-learning model representations corresponding to one or more non-machine-learning models, or other machine learning or non-machine learning model representations. Operation 602 may be performed by a service interface subsystem that is the same as or similar to service interface subsystem 112, in accordance with one or more embodiments.

In an operation 604, user input indicating selection of one or more model representations may be obtained via the user interface. As an example, the user input may indicate selection of the first machine learning model representation, the second machine learning model representation, a non-machine-learning model representation corresponding to a non-machine-learning model, or other model representations. Additionally, or alternatively, the user input may indicate connection of the first machine learning model representation to at least one other model representation. As an example, the other model representation may include the second machine learning model representation, the non-machine-learning model representation, or other model representation. Operation 604 may be performed by a service interface subsystem that is the same as or similar to service interface subsystem 112, in accordance with one or more embodiments.

In an operation 606, a presentation of one or more model representations may be caused via the user interface based on the user input. As an example, the presentation may include a presentation of the first machine learning model representation, the second machine learning model representation, and the non-machine-learning model representation. Additionally, or alternatively, the presentation may include a connection component shared between the first machine learning model representation and at least one other model representation. As an example, the other model representation may include the second machine learning model representation, the non-machine-learning model representation, or other model representation. Operation 606 may be performed by a presentation subsystem that is the same as or similar to presentation subsystem 118, in accordance with one or more embodiments.

In an operation 608, a software application (or at least a portion thereof) may be generated based on the user input. As an example, the software application (or at least a portion thereof) may be generated such that the software application comprises (i) an instance of the first machine learning model, an instance of the second machine learning model, and an instance of the non-machine-learning model and (ii) an input/output data path between the instance of the first machine learning model and at least one other instance. The software application may be generated such that the software application is configured to cause a prediction outputted by the instance of the first machine learning model to be provided as input to the at least one other instance for further processing by the at least one other instance. The at least one other instance may include the instance of the second machine learning model, the instance of the non-machine-learning model, or other instance. In some embodiments, with respect to operation 608, at least the portion of the software application may be generated such that the software application is configured to cause a prediction outputted by the instance of the first machine learning model to be provided as input to the at least one other instance for further processing by the at least one other instance. Operation 608 may be performed by an application integration subsystem that is the same as or similar to application integration subsystem 120, in accordance with one or more embodiments.

Figure 7:
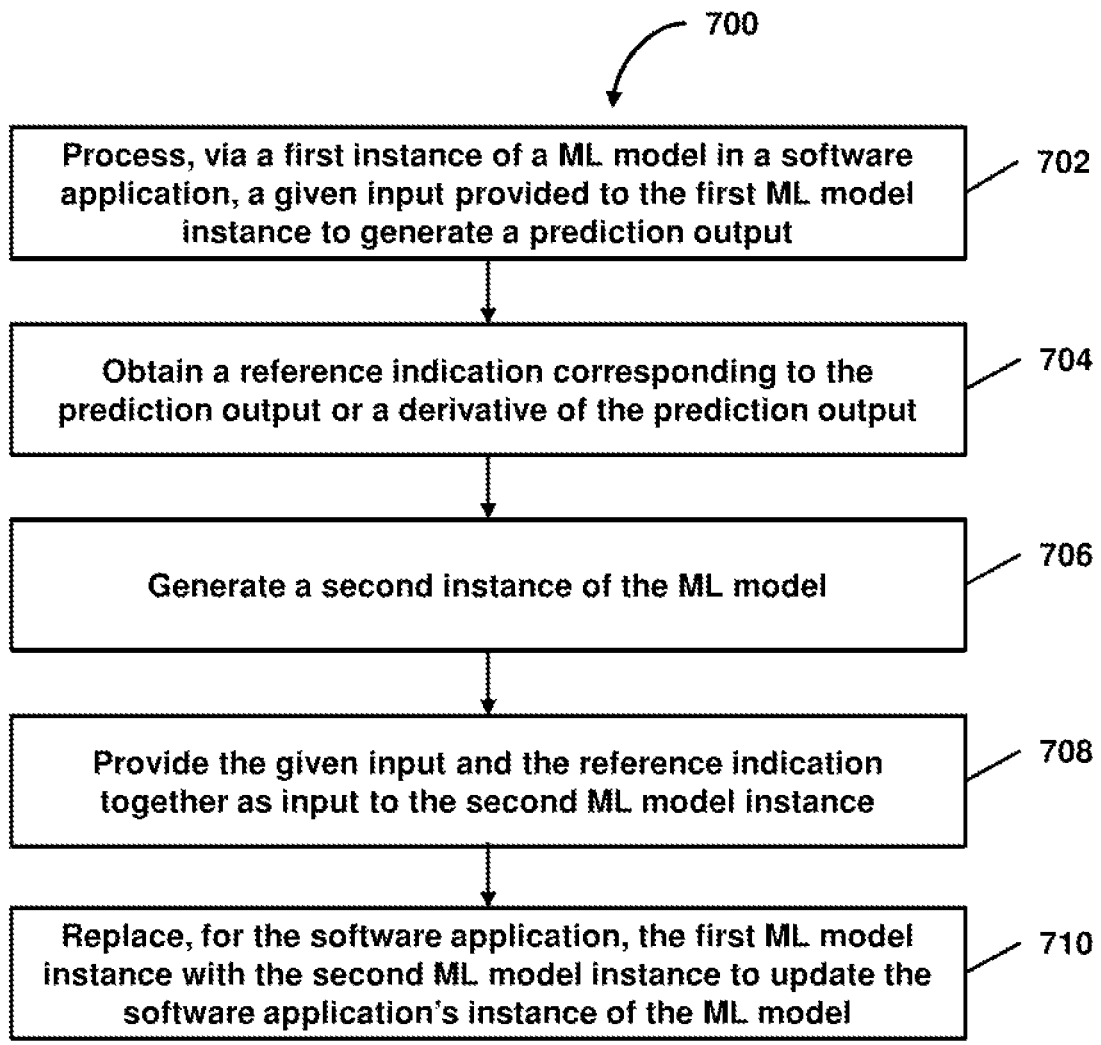
FIG. 7 shows a flowchart of a method of updating machine learning models of a software application, in accordance with one or more embodiments.

FIG. 7 shows a flowchart of a method of updating machine learning models of a software application, in accordance with one or more embodiments. In an operation 702, a given input may be provided to and processed via a first instance of a machine learning model in a software application to generate a prediction output. The given input may include one or more text, metadata, images, audio, videos, or other input. Operation 702 may be performed by a model subsystem that is the same as or similar to model subsystem 114, in accordance with one or more embodiments.

In an operation 704, a reference indication corresponding to the prediction output (or a derivative of the prediction output) may be obtained. As an example, the reference indication may include (i) reference outputs that are to be derived from the first instance's processing of such inputs (e.g., user-confirmed or user-provided outputs, outputs confirmed through one or more machine learning models' processing of such inputs, outputs confirmed multiple times by processing of such inputs by respective sets of machine learning models, or other reference outputs), (ii) reference indications of outputs that are not to be derived from the first instance's processing of such inputs (e.g., user indications that such outputs are inaccurate or other reference indications), or (iii) other reference indications. Operation 704 may be performed by a feedback subsystem that is the same as or similar to feedback subsystem 116, in accordance with one or more embodiments.

In an operation 706, a second instance of the machine learning model may be generated. As an example, the second instance of the machine learning model may include a copy of the first instance of the machine learning model, a copy of a version of the machine learning model different from the version of the first instance of the machine learning model, or other instance of the machine learning model. Operation 706 may be performed by a model subsystem that is the same as or similar to model subsystem 114, in accordance with one or more embodiments.

In an operation 708, the given input and the reference indication may be provided together as input to the second instance of the machine learning model. Operation 708 may be performed by a model subsystem that is the same as or similar to model subsystem 114, in accordance with one or more embodiments.

In an operation 710, the first instance of the machine learning model may be replaced with the second instance of the machine learning model for the software application to update the software application's instance of the machine learning model. As an example, upon replacement, the first instance may not be available to one or more users (e.g., all users, only accessible by certain users, etc.). As another example, upon replacement, the first instance may be available to owners of the machine learning model or the first instance. As another example, upon replacement, the first instance may only be available to administrators of the service platform. Operation 710 may be performed by an application integration subsystem that is the same as or similar to application integration subsystem 120, in accordance with one or more embodiments.

In some embodiments, the various computers and subsystems illustrated in FIG. 1 may include one or more computing devices that are programmed to perform the functions described herein. The computing devices may include one or more electronic storages (e.g., prediction database(s) 132, which may include training data database(s) 134, model database(s) 136, etc., or other electric storages), one or more physical processors programmed with one or more computer program instructions, and/or other components. The computing devices may include communication lines or ports to enable the exchange of information with a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-120 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-120 described herein is for illustrative purposes, and is not intended to be limiting, as any of subsystems 112-120 may provide more or less functionality than is described. For example, one or more of subsystems 112-120 may be eliminated, and some or all of its functionality may be provided by other ones of subsystems 112-120. As another example, additional subsystems may be programmed to perform some or all of the functionality attributed herein to one of subsystems 112-120.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: providing a service platform that enables a developer to obtain training item information for training a machine learning model, the training item information indicating inputs and prediction outputs derived from one or more machine learning models' processing of the inputs; obtaining, via the service platform, input/output information derived from machine learning models, the input/output information indicating (i) first items provided as input to at least one model of the machine learning models, (ii) first prediction outputs derived from the at least one model's processing of the first items, (iii) second items provided as input to at least another model of the machine learning models, and (iv) second prediction outputs derived from the at least one other model's processing of the second items; and providing, via the service platform, the input/output information derived from the machine learning models to update a first machine learning model, wherein the first machine learning model is updated based on the input/output information being provided as input to the first machine learning model.
2. The method of embodiment 1, wherein the first machine learning model is stored as a first instance at the service platform, the method further comprising: generating a second instance of the first machine learning model, wherein providing the input/output information to update the first machine learning model comprises providing the input/output information as input to the second instance of the first machine learning model to train the second instance of the first machine learning model, the training of the first machine learning model based on the input/output information causing updating of the second instance of the first machine learning model; analyzing accuracy of the updated second instance of the first machine learning model; and causing, based on the accuracy, the updated second instance of the first machine learning model to be stored at the service platform as a version of the first machine learning model.
3. The method of embodiment 2, wherein one or more machine learning models hosted at the service platform (i) analyzes the accuracy of the updated second instance of the first machine learning model and (ii) causes, based on the accuracy, the updated second instance of the first machine learning model to be stored at the service platform as a version of the first machine learning model.
4. The method of embodiment 2, wherein one or more machine learning models hosted at the service platform (i) provides the input/output information as input to the second instance of the first machine learning model to train the second instance of the first machine learning model, (ii) analyzes the accuracy of the updated second instance of the first machine learning model, and (iii) causes, based on the accuracy, the updated second instance of the first machine learning model to be stored at the service platform as a version of the first machine learning model.
5. The method of embodiment 2, wherein one or more machine learning models hosted at the service platform (i) generates the second instance of the first machine learning model, (ii) provides the input/output information as input to the second instance of the first machine learning model to train the second instance of the first machine learning model, (iii) analyzes the accuracy of the updated second instance of the first machine learning model, and (iv) causes, based on the accuracy, the updated second instance of the first machine learning model to be stored at the service platform as a version of the first machine learning model.
6. The method of any of embodiments 1-5, further comprising: obtaining, via the service platform, a request for information to train a second machine learning model; and providing, via the service platform, based on the request, at least some of the input/output information derived from the machine learning models, wherein the second machine learning model is trained based on the at least some of the input/output information being provided as input to the second machine learning model.
7. The method of embodiment 6, wherein the request comprises one or more request parameters, the one or more request parameters indicating at least one of a domain associated with the second machine learning model, an input data type associated with the second machine learning model, or an output data type associated with the second machine learning model, and wherein providing the at least some of the input/output information comprises: selecting the at least some of the input/output information based on the one or more request parameters; and providing, via the service platform, the at least some of the input/output information based on the selection.
8. The method of any of embodiments 6-7, wherein the request comprises one or more request parameters, the one or more request parameters indicating a requested concept on which the second machine learning model is to be trained, and wherein providing the at least some of the input/output information comprises: selecting the first items, the first prediction outputs, the second items, and the second prediction outputs based on each of the first prediction outputs and the second prediction outputs being a concept similar to the requested concept; and providing, via the service platform, the first items, the first prediction outputs, the second items, and the second prediction outputs based on the selection.
9. The method of any of embodiments 1-8, wherein the first machine learning model is stored as a first instance at the service platform, the method further comprising: generating a second instance of the first machine learning model; obtaining code information indicating one or more code-related changes for the first machine learning model; updating the second instance of the first machine learning model based on the code information; analyzing accuracy, speed, or cost of the updated second instance of the first machine learning model; and causing, based on the accuracy or cost, the updated second instance of the first machine learning model to be stored at the service platform as a version of the first machine learning model.

10. The method of embodiment 9, wherein one or more machine learning models hosted at the service platform (i) generates the second instance of the first machine learning model, (ii) updates the second instance of the first machine learning model based on the code information, (iii) analyzes the accuracy or cost of the updated second instance of the first machine learning model, and (iv) causes, based on the accuracy or cost, the updated second instance of the first machine learning model to be stored at the service platform as a version of the first machine learning model.

11. A method comprising: causing user-selectable model representations to be available via a user interface, the user-selectable model representations comprising a first machine learning model representation corresponding to a first machine learning model, a second machine learning model representation corresponding to a second machine learning model, and non-machine-learning model representations corresponding to non-machine-learning models; obtaining, via the user interface, user input indicating selection of the first machine learning model representation, the second machine learning model representation, and a non-machine-learning model representation corresponding to a non-machine-learning model; causing, via the user interface, based on the user input, a presentation of (i) the first machine learning model representation, the second machine learning model representation, and the non-machine-learning model representation and (ii) a connection component shared between the first machine learning model representation and at least one other model representation, the at least one other model representation comprising the second machine learning model representation or the non-machine-learning model representation; and generating, based on the user input, at least a portion of a software application such that the software application comprises (i) an instance of the first machine learning model, an instance of the second machine learning model, and an instance of the non-machine-learning model and (ii) an input/output data path between the instance of the first machine learning model and at least one other instance, the at least one other instance comprising the instance of the second machine learning model or the instance of the non-machine-learning model.

12. The method of embodiment 11, wherein the at least one other model representation comprises the second machine learning representation, and the at least one instance comprises the instance of the second machine learning, and wherein at least the portion of the software application is generated such that the software application comprises (i) the instance of the first machine learning model, the instance of the second machine learning model, and the instance of the non-machine-learning model and (ii) the input/output data path between the instance of the first machine learning model and the instance of the second machine learning model.

13. The method of any of embodiments 11-12, wherein at least the portion of the software application is generated such that the software application is configured to cause a prediction outputted by the instance of the first machine learning model to be provided as input to the at least one other instance for further processing by the at least one other instance.

14. The system of any of embodiments 11-13, further comprising: processing, via the instance of the first machine learning model, a first input provided to the instance of the first machine learning model to generate a prediction output; obtaining a reference indication corresponding to the prediction output or a derivative of the prediction output; and updating the software application's instance of the first machine learning model based on the reference indication.

15. The system of embodiment 14, wherein updating the software application's instance of the first machine learning model comprises providing the first input and the reference indication together as input to at least one instance of the first machine learning model.

16. The system of embodiment 15, wherein the at least one instance of the first machine learning model comprises a second instance of the first machine learning model different from the first instance of the first machine learning model, and wherein updating the software application's instance of the first machine learning model comprises replacing, for the software application, the instance of the first machine learning model with the second instance of the first machine learning model.

17. The method of embodiment 15, wherein the at least one instance of the first machine learning model comprises the instance of the first machine learning model.

18. The method of any of embodiments 11-17, further comprising: processing, via the instance of the first machine learning model, a first input provided to the instance of the first machine learning model to generate a first prediction output; processing, via the instance of the second machine learning model, a second input provided to the instance of the second machine learning model to generate a second prediction output, the second input comprising the first prediction output or another output derived from the first prediction output; obtaining a reference indication corresponding to the second prediction output or another output derived from the second prediction output; and updating the software application's instance of the second machine learning model based on the reference indication.

19. The method of embodiment 18, wherein updating the software application's instance of the second machine learning model comprises providing the second input and the reference indication together as input to at least one instance of the second machine learning model.

20. The method of embodiment 19, wherein the at least one instance of the second machine learning model comprises a second instance of the second machine learning model different from the instance of the second machine learning model, and wherein updating the software application's instance of the second machine learning model comprises replacing, for the software application, the first instance of the second machine learning model with the second instance of the second machine learning model.

21. The method of embodiment 19, further comprising: processing, via the instance of the second machine learning model, the second input and the reference indication provided to the instance of the second machine learning model to generate another reference indication corresponding to the first prediction output;

and updating the software application's instance of the first machine learning model based on the other reference indication.

22. The method of embodiment 21, wherein updating the software application's instance of the first machine learning model comprises providing the first input and the other reference indication together as input to at least one instance of the first machine learning model.

23. The method of embodiment 22, wherein the at least one instance of the first machine learning model comprises a second instance of the first machine learning model different from the first instance of the first machine learning model, and wherein updating the software application's instance of the first machine learning model comprises replacing, for the software application, the instance of the first machine learning model with the second instance of the first machine learning model.

24. The method of any of embodiments 11-23, wherein the user input includes connection of the first neural network representation to the at least one other model representation.

25. The method of any of embodiments 11-24, wherein the first machine learning model comprises a first neural network, and the second machine learning model includes a second neural network.

26. A tangible, non-transitory, machine-readable medium storing instructions that when executed by a data processing apparatus cause the data processing apparatus to perform operations comprising those of any of embodiments 1-25.

27. A system, comprising: one or more processors; and memory storing instructions that when executed by the processors cause the processors to effectuate operations comprising those of any of embodiments 1-25.

What is claimed is:

1. A computing system comprising:
a storage configured to store a collection of training data that is previously consumed by machine learning models during training of the machine learning models via a host platform; and
a processor configured to:
receive a request to train a first machine learning model, the request comprising one or more parameters of input data to be used to train the first machine learning model,
select a training data set previously consumed by a second machine learning model based on input items within the training data set matching the one or more parameters of the input data in the received request,
train the first machine learning model via execution of the first machine learning model on the selected training data set via the host platform;
automatically test, in response to the training of the first machine learning model on the selected training data set, the trained first machine learning model to determine a predictive accuracy of the trained first machine learning model;
determine, based on the determined predictive accuracy of the trained first machine learning model and a predictive accuracy of the second machine learning model, that the trained first machine learning model is more accurate than the second machine learning model;
merge, automatically in response to the determination that the trained first machine learning model is more accurate than the second machine learning model, components from the first machine learning model with the second machine learning model to obtain an updated instance of the second machine learning model;
replace, in a memory storing the second machine learning model, the second machine learning model with the updated instance of the second machine learning model, the updated instance of the second machine learning model including a distinct version indicator associated therewith;
present a user-selectable model representation of the updated instance of the second machine learning model via a user interface;
receive, via the user interface, an indication of a selection of the updated instance of the second machine learning model; and
generate, in response to the reception of the selection of the updated instance of the second machine learning model, at least a portion of a software application.

2. The computing system of claim 1, wherein the first machine learning model is a separate instance of a same model type as the second machine learning model.

3. The computing system of claim 1, wherein the processor is further configured to remove a subset of data of the selected training data set prior to execution of the first machine learning model, and train the first machine learning model on remaining data within the selected training data set.

4. The computing system of claim 3, wherein the processor is further configured to execute the trained first machine learning model on the removed subset of data to determine an accuracy of the trained first machine learning model.

5. The computing system of claim 1, wherein the processor is configured to select the training data set via a machine learning model executing on the host platform.

6. The computing system of claim 1, wherein the processor is configured to receive the request to train the first machine learning model from a search input via a search tool on a website.

7. A method comprising:
storing a collection of training data that is previously consumed by machine learning models during training of the machine learning models via a host platform;
receiving a request to train a first machine learning model, the request comprising one or more parameters of input data to be used to train the first machine learning model;
selecting a training data set previously consumed by a second machine learning model based on input items within the training data set matching the one or more parameters of the input data in the received request; and
training the first machine learning model via execution of the first machine learning model on the selected training data set via the host platform;
automatically testing, in response to the training of the first machine learning model on the selected training data set, the trained first machine learning model to determine a predictive accuracy of the trained first machine learning model;
determining, based on the determined predictive accuracy of the trained first machine learning model and a predictive accuracy of the second machine learning model, that the trained first machine learning model is more accurate than the second machine learning model;
merging, automatically in response to the determination that the trained first machine learning model is more accurate than the second machine learning model, components from the first machine learning model with the second machine learning model to obtain an updated instance of the second machine learning model;
replacing, in a memory storing the second machine learning model, the second machine learning model with the updated instance of the second machine learning model, the updated instance of the second machine learning model including a distinct version indicator associated therewith;
presenting a user-selectable model representation of the updated instance of the second machine learning model via a user interface;
receiving, via the user interface, an indication of a selection of the updated instance of the second machine learning model; and
generating, in response to the reception of the selection of the updated instance of the second machine learning model, at least a portion of a software application.

8. The method of claim 7, wherein the first machine learning model is a separate instance of a same model type as the second machine learning model.

9. The method of claim 7, wherein the training comprises removing a subset of data of the selected training data set prior to execution of the first machine learning model, and training the first machine learning model on remaining data within the selected training data set.

10. The method of claim 9, wherein the method further comprises executing the trained first machine learning model on the removed subset of data to determine an accuracy of the trained first machine learning model.

11. The method of claim 7, wherein the selecting is performed by a third machine learning model executing on the host platform.

12. The method of claim 7, wherein the receiving the request to train the first machine learning model comprises receiving a search input via a search tool on a website.

13. A non-transitory storage media comprising instructions which when executed by a processor cause a computer to perform a method comprising:
storing a collection of training data that is previously consumed by machine learning models during training of the machine learning models via a host platform;
receiving a request to train a first machine learning model, the request comprising one or more parameters of input data to be used to train the first machine learning model;
selecting a training data set previously consumed by a second machine learning model based on input items within the training data set matching the one or more parameters of the input data in the received request; and
training the first machine learning model via execution of the first machine learning model on the selected training data set via the host platform;
automatically testing, in response to the training of the first machine learning model on the selected training data set, the trained first machine learning model to determine a predictive accuracy of the trained first machine learning model;
determining, based on the determined predictive accuracy of the trained first machine learning model and a predictive accuracy of the second machine learning model, that the trained first machine learning model is more accurate than the second machine learning model;
merging, automatically in response to the determination that the trained first machine learning model is more accurate than the second machine learning model, components from the first machine learning model with the second machine learning model to obtain an updated instance of the second machine learning model;
replacing, in a memory storing the second machine learning model, the second machine learning model with the updated instance of the second machine learning model, the updated instance of the second machine learning model including a distinct version indicator associated therewith;
presenting a user-selectable model representation of the updated instance of the second machine learning model via a user interface;
receiving, via the user interface, an indication of a selection of the updated instance of the second machine learning model; and
generating, in response to the reception of the selection of the updated instance of the second machine learning model, at least a portion of a software application.

14. The non-transitory storage media of claim 13, wherein the first machine learning model is a separate instance of a same model type as the second machine learning model.

* * * * *